US010880293B2

(12) United States Patent
Kim et al.

(10) Patent No.: US 10,880,293 B2
(45) Date of Patent: Dec. 29, 2020

(54) AUTHENTICATION OF VEHICLE-TO-VEHICLE COMMUNICATIONS

(71) Applicant: Ford Global Technologies, LLC, Dearborn, MI (US)

(72) Inventors: Yu Seung Kim, San Jose, CA (US); Jinhyoung Oh, Fremont, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 204 days.

(21) Appl. No.: 16/040,013

(22) Filed: Jul. 19, 2018

(65) Prior Publication Data

US 2019/0068582 A1 Feb. 28, 2019

Related U.S. Application Data

(60) Provisional application No. 62/550,312, filed on Aug. 25, 2017.

(51) Int. Cl.
| | |
|---|---|
| *H04L 29/00* | (2006.01) |
| *H04L 29/06* | (2006.01) |
| *H04W 4/46* | (2018.01) |
| *G01S 5/00* | (2006.01) |
| *G05D 1/00* | (2006.01) |

(Continued)

(52) U.S. Cl.
CPC ......... *H04L 63/0823* (2013.01); *B60W 30/09* (2013.01); *G01S 5/0072* (2013.01); *G01S 5/0284* (2013.01); *G05D 1/0088* (2013.01); *G07C 5/008* (2013.01); *H04W 4/02* (2013.01); *H04W 4/027* (2013.01); *H04W 4/46* (2018.02); *H04W 12/06* (2013.01); *H04W 12/1202* (2019.01); *B60W 2556/65* (2020.02); *G05D 2201/0213* (2013.01); *H04L 63/1425* (2013.01); *H04L 63/1483* (2013.01); *H04W 12/00503* (2019.01); *H04W 12/1004* (2019.01)

(58) Field of Classification Search
CPC ..... H04W 4/02; H04W 4/46; H04W 12/1202; H04W 12/1004; H04W 12/00503; H04L 63/1425; H04L 63/1483; G01S 5/0072; G01S 5/0284; G05D 1/0088; G05D 2201/0213; G07C 5/008
See application file for complete search history.

(56) References Cited

U.S. PATENT DOCUMENTS 9,165,198 B2 10/2015 Siegel
10,440,536 B2 * 10/2019 Nemec ................ B60W 30/181
(Continued)

FOREIGN PATENT DOCUMENTS

JP 2011204151 A 10/2011

*Primary Examiner* — Don G Zhao
(74) *Attorney, Agent, or Firm* — David R. Stevens; Stevens Law Group

(57) ABSTRACT

Systems, methods, and devices for authenticating vehicle-to-vehicle communication are disclosed. A method includes receiving sensor data from a first vehicle and receiving secondary sensor data from a second vehicle. The method includes extracting, based on the sensor data and the secondary sensor data, an authentication comprising one or more of: a proximity of the second vehicle to the first vehicle or a common object identified by the sensor data and the secondary sensor data. The method includes determining whether the authentication satisfies a trust threshold of the first vehicle.

20 Claims, 16 Drawing Sheets

(51) Int. Cl.
  *B60W 30/09* (2012.01)
  *G07C 5/00* (2006.01)
  *H04W 12/06* (2009.01)
  *G01S 5/02* (2010.01)
  *H04W 12/12* (2009.01)
  *H04W 4/02* (2018.01)
  *H04W 12/10* (2009.01)
  *H04W 12/00* (2009.01)

(56) References Cited

U.S. PATENT DOCUMENTS

| | | | | |
|---|---|---|---|---|
| 2001/0049791 A1* | 12/2001 | Gascher | ............... | G01S 13/765 713/185 |
| 2003/0080878 A1* | 5/2003 | Kirmuss | ............... | B60R 11/02 340/936 |
| 2006/0059229 A1* | 3/2006 | Bain | ............... | G01C 21/26 709/205 |
| 2008/0297330 A1* | 12/2008 | Jeon | ............... | B60R 25/102 340/426.11 |
| 2012/0105637 A1* | 5/2012 | Yousefi | ............... | H04W 4/46 348/148 |
| 2013/0344859 A1* | 12/2013 | Abramson | ............... | H04M 1/72577 455/418 |
| 2014/0136414 A1* | 5/2014 | Abhyanker | ............... | G06Q 50/28 705/44 |
| 2014/0281534 A1* | 9/2014 | McCormack | ............... | H04L 63/0428 713/168 |
| 2014/0302774 A1* | 10/2014 | Burke | ............... | G07C 5/08 455/3.05 |
| 2014/0306834 A1* | 10/2014 | Ricci | ............... | G06Q 10/20 340/902 |
| 2014/0308902 A1* | 10/2014 | Ricci | ............... | G06F 3/0481 455/66.1 |
| 2015/0025708 A1* | 1/2015 | Anderson | ............... | A61B 5/6804 701/2 |
| 2015/0052352 A1 | 2/2015 | Dolev | | |
| 2015/0141043 A1* | 5/2015 | Abramson | ............... | G01C 21/34 455/456.1 |
| 2015/0168174 A1* | 6/2015 | Abramson | ............... | G01C 21/3697 701/408 |
| 2015/0312404 A1* | 10/2015 | Abramson | ............... | H04W 4/027 455/418 |
| 2016/0021238 A1* | 1/2016 | Abramson | ............... | H04W 48/04 455/418 |
| 2016/0099927 A1* | 4/2016 | Oz | ............... | H04L 63/08 726/9 |
| 2016/0205238 A1* | 7/2016 | Abramson | ............... | G01C 21/3641 455/456.4 |
| 2016/0216130 A1* | 7/2016 | Abramson | ............... | G01C 21/3626 |
| 2016/0275801 A1* | 9/2016 | Kopardekar | ............... | G08G 5/0043 |
| 2016/0335897 A1* | 11/2016 | Naserian | ............... | G08G 1/161 |
| 2017/0132477 A1* | 5/2017 | Kim | ............... | G08G 1/096741 |
| 2017/0153314 A1* | 6/2017 | Siemes | ............... | G01S 13/325 |
| 2017/0166168 A1* | 6/2017 | Hache | ............... | B60R 25/24 |
| 2017/0180388 A1* | 6/2017 | Belz | ............... | H04L 63/105 |
| 2017/0274827 A1* | 9/2017 | Lewis | ............... | G08G 1/167 |
| 2017/0279957 A1* | 9/2017 | Abramson et al. | ............... | H04M 1/72577 |
| 2018/0079284 A1* | 3/2018 | Choi | ............... | G02B 27/0101 |
| 2018/0090013 A1* | 3/2018 | Park | ............... | G08G 5/0026 |
| 2018/0102831 A1* | 4/2018 | Murphy | ............... | H04W 12/06 |
| 2018/0124233 A1* | 5/2018 | Abramson | ............... | G06F 3/017 |
| 2018/0126951 A1* | 5/2018 | Ricci | ............... | B60R 25/2018 |
| 2018/0202822 A1* | 7/2018 | DeLizio | ............... | G01C 21/3407 |
| 2018/0227514 A1* | 8/2018 | Takahashi | ............... | H04N 5/353 |
| 2019/0061686 A1* | 2/2019 | Neuhoff | ............... | G07C 9/00309 |
| 2019/0061939 A1* | 2/2019 | Anand | ............... | H04W 12/06 |
| 2019/0073543 A1* | 3/2019 | Ichinose | ............... | G06K 9/6201 |
| 2019/0384320 A1* | 12/2019 | Lee | ............... | H04L 9/0894 |
| 2020/0012281 A1* | 1/2020 | Jaegal | ............... | G05D 1/0094 |

* cited by examiner

US 10,880,293 B2

AUTHENTICATION OF VEHICLE-TO-VEHICLE COMMUNICATIONS

CROSS-REFERENCE TO RELATED APPLICATIONS

This application claims the benefit of U.S. Provisional Application No. 62/550,312 filed Aug. 25, 2017, and is hereby incorporated by reference herein in its entirety, including but not limited to those portions that specifically appear hereinafter, the incorporation by reference being made with the following exception: In the event that any portion of the above-referenced provisional application is inconsistent with this application, this application supersedes the above-referenced provisional application.

STATEMENT REGARDING FEDERALLY SPONSORED RESEARCH OR DEVELOPMENT

Not applicable.

TECHNICAL FIELD

This disclosure relates to performing authenticated vehicle-to-vehicle communications.

BACKGROUND

Automobiles provide a significant portion of transportation for commercial, government, and private entities. Autonomous vehicles and driving assistance systems are currently being developed and deployed to provide safety, reduce an amount of user input required, or even eliminate user involvement entirely. For example, some driving assistance systems, such as crash avoidance systems, may monitor driving, positions, and a velocity of the vehicle and other objects while a human is driving. When the system detects that a crash or impact is imminent the crash avoidance system may intervene and apply a brake, steer the vehicle, or perform other avoidance or safety maneuvers. As another example, autonomous vehicles may drive and navigate a vehicle with little or no user input. Autonomous vehicle may further communicate with other autonomous vehicles to aid in crash avoidance and safety maneuvers. Efficient authentication of a vehicle's identity may be beneficial in communication between two or more autonomous vehicle.

Advances in vehicular technology include vehicle-to-vehicle (V2V) communications that may require authorization to ensure safety and security for a vehicle owner or deriver. Inter-vehicle communication, among many other applications, is known for improving safety features for each vehicle. In V2V communications, the authenticity of a vehicle identity is verified by its digital certificate. Considering its safety critical implication in many V2V applications, the validity of the digital certificate may be secured through a public-key infrastructure (PKI) system. However, in some implementations, it is nearly impossible to perfectly prevent any security breach in PKI. As seen in past decades, the certificate authority (CA) can be compromised to issue an unauthorized certificate, or even benign Cas can mistakenly issue a valid certificate to unauthorized parties. Further, it may be possible to directly capture the signing key for a certificate if it is not properly stored in a secure place.

BRIEF DESCRIPTION OF THE DRAWINGS

In order that the advantages of the disclosure will be readily understood, a more particular description of the disclosure briefly described above will be rendered by reference to specific embodiments illustrated in the appended drawings. Understanding that these drawings depict only typical embodiments of the disclosure and are not therefore to be considered limiting of its scope, the disclosure will be described and explained with additional specificity and detail through use of the accompanying drawings, in which.

DETAILED DESCRIPTION

Figure 1:
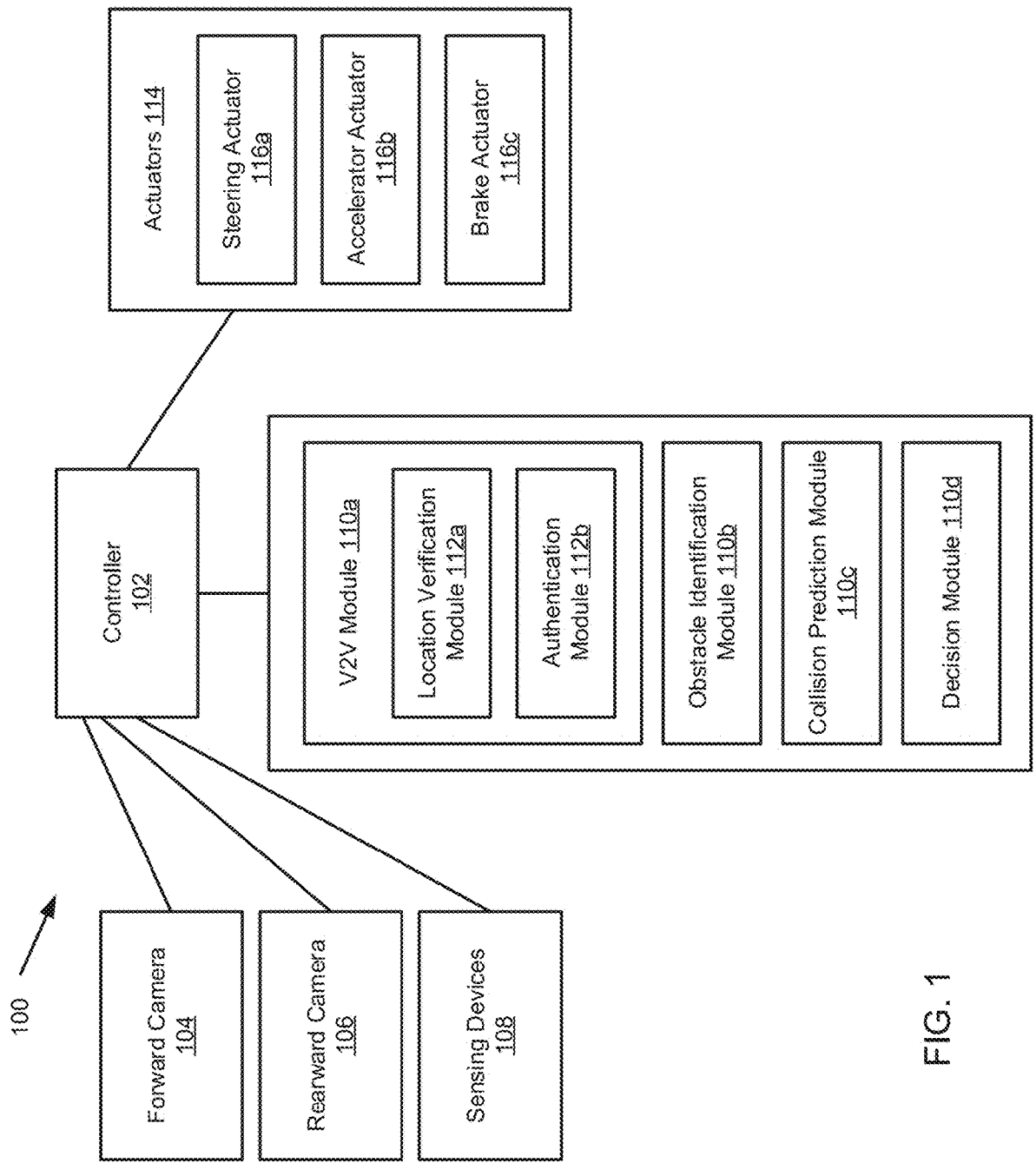
FIG. 1 is a schematic block diagram of an autonomous vehicle or assisted driving system in accordance with the teachings and principles of the disclosure.

Advances in vehicular technology include vehicle-to-vehicle (V2V) communications that may require authorization to ensure safety and security for a vehicle owner or deriver. Inter-vehicle communication, among many other applications, is known for improving safety features for each vehicle. In V2V communications, the authenticity of a vehicle identity is verified by its digital certificate. Considering its safety critical implication in many V2V applications, the validity of the digital certificate may be secured through a public-key infrastructure (PKI) system. However, in some implementations, it is nearly impossible to perfectly prevent any security breach in PKI. As seen in past decades, the certificate authority (CA) can be compromised to issue an unauthorized certificate, or even benign Cas can mistakenly issue a valid certificate to unauthorized parties. Further, it may be possible to directly capture the signing key for a certificate if it is not properly stored in a secure place.

While V2V communication are intended to increase the security and safety of vehicles, it also opens up potential threats for adversaries. An attacker can launch different types of attacks to benefit themselves or to maliciously cause damage to victims. For example, attackers may transmit inaccurate information to influence neighboring vehicles to divert other vehicles on the path to gain free path or forge their sensor information to circumvent liabilities for accidents. Platooning vehicles are also vulnerable to collision induction attacks. In addition, Sybil attacks are also possible by using multiple non-existing identities or pseudonyms. Hence, securing inter-vehicular communications is of critical significance and may save users from life-threatening attacks.

In efforts to secure the V2V communications, Dedicated Short-Range Communications (DSRC), the de facto V2V communication standard, leverages public-key infrastructure (PKI) systems to authenticate public keys of vehicles. While this solution aims to provide sufficient security guarantees, many attacks are in still possible. One of the main problems results from location spoofing impersonation attacks. In these attacks, an inside attacker (i.e., a malicious vehicle with a correct certificate), transmits messages with forged locations. For example, an attacker creates a "ghost vehicle" by forging his location to victim vehicles. Similarly, a malicious vehicle in a platoon may impersonate another vehicle's position by forging its location within the platoon.

Applicant recognizes that supplementary mechanisms may be supplied in addition to PKI authentication for V2V communication. Such supplementary mechanisms may leverage camera sensors that are already prevalent in many autonomous or driving assistance vehicles. Such supplementary mechanisms may include two vehicles taking a snapshot of each other, exchanging the snapshot, and verifying each other's identity by extracting, for example, a vehicle number, a relative distance between the vehicle, an azimuth angle from the received image, and so forth.

However, an advanced attacker may still be able to impersonate a vehicle's identity by preparing a dictionary of images taken from various locations offline and selecting an image from the dictionary to pretend to be the other vehicle around the victim vehicle. Further, an attacking vehicle might take a snapshot of the victim vehicle, crop out the victim vehicle from the snapshot, and superimpose the victim vehicle into the appropriate position to mislead the victim vehicle to believe that the image was taken by the attacking vehicle. Due to recent advances in computer vision, new camera image modification techniques may be available to an attacking vehicle.

Applicant herein presents systems, methods, and devices for vehicle-to-vehicle authentication and communication that overcome weaknesses presently known in PKI systems and other supplementary mechanisms that may be prone to attack by advanced vehicle systems. In an embodiment of the disclosure, a method for authenticating vehicle-to-vehicle communication is provided. The method includes receiving sensor data from a first vehicle and receiving secondary sensor data from a second vehicle. The method includes extracting, based on the sensor data and the secondary sensor data, an authentication comprising one or more of: a proximity of the second vehicle relative to the first vehicle, or a common object identified by the sensor data and the secondary sensor data. The method further includes determining whether the authentication satisfies a trust threshold for the first vehicle. The method may further include permitting communication between the first vehicle and the second vehicle if the authentication satisfies the trust threshold.

It will be readily understood that the components of the present disclosure, as generally described and illustrated in the Figures herein, could be arranged and designed in a wide variety of different configurations. Thus, the following more detailed description of the embodiments of the disclosure, as represented in the Figures, is not intended to limit the scope of the disclosure, as claimed, but is merely representative of certain examples of presently contemplated embodiments in accordance with the disclosure. The presently described embodiments will be best understood by reference to the drawings, wherein like parts are designated by like numerals throughout.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present disclosure may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, a controller 102 may be housed within a vehicle. The vehicle may include any vehicle known in the art. The vehicle may have all of the structures and features of any vehicle known in the art including, wheels, a drive train coupled to the wheels, an engine coupled to the drive train, a steering system, a braking system, and other systems known in the art to be included in a vehicle.

As discussed in greater detail herein, the controller 102 may perform autonomous navigation and collision avoidance. In particular, the controller 102 may perform authenticated V2V communication in accordance with an embodiment of the present disclosure.

The controller 102 may be coupled a forward facing camera 104 and a rearward facing camera 106. The forward facing camera 104 may be mounted on a vehicle with a field of view facing forward and the rearward-facing camera 106 may be mounted to the vehicle having the field of view thereof facing in a rearward direction. The rearward-facing camera 106 may be a conventional back-up camera or a separate camera having a different field of view. The cameras 104, 106 may be used for performing authentication methods as disclosed herein and may additionally be used for performing obstacle detection.

The controller 102 may be coupled to one or more other sensing devices 108, which may include microphones or other sensors useful for detecting obstacles, such as RADAR, LIDAR, SONAR, ultrasound, and the like. For example, a plurality of different sensors may be attached to an advanced driver-assistance systems (ADAS) bus or system. Any of these available sensors may be available to provide sensor data for purposes of assisted driving, automated driving, and/or authenticating vehicle-to-vehicle (V2V) communication.

The controller 102 may execute a V2V module 110a. The V2V module 110a includes a location verification module 112a. The location verification module 112a verifies that another vehicle seeking to communicate with the controller 102 using V2V communication is in fact a vehicle in proximity to the controller 102. In particular, the location verification module 112a verifies the location of the other vehicle by exchanging images or other sensor data (e.g., frames of RADAR, LIDAR, SONAR, ultrasound, or other sensor data), object maps, and/or velocity maps, as discussed in greater detail below.

The V2V module 110a may further include an authentication module 112b. The authentication module 112b performs key exchange, such as using the Diffie-Hellman approach, public key encryption, or some other authentication technique. The authentication module 112b may further handle performing secured communication between the controller and the other vehicle. The manner in which authentication and secured communication is performed is described in greater detail below.

The controller 102 may further execute an obstacle identification module 110b, collision prediction module 110c, and decision module 110d. The obstacle identification module 110b may analyze one or more image streams from the cameras 104, 106 or other camera and identifies potential obstacles, including people, animals, vehicles, buildings, curbs, and other objects and structures. The obstacle identification module 110b may additionally identify potential obstacles from outputs of the sensing devices 108, such as using data from a LIDAR, RADAR, ultrasound, or other sensing system.

The collision prediction module 110c predicts which obstacle images are likely to collide with the vehicle based on its current trajectory or current intended path. The decision module 110d may make a decision to stop, accelerate, turn, etc. in order to avoid obstacles. The manner in which the collision prediction module 110c predicts potential collisions and the manner in which the decision module 110d takes action to avoid potential collisions may be according to any method or system known in the art of autonomous vehicles.

The decision module 110d may control the trajectory of the vehicle by actuating one or more actuators 114 controlling the direction and speed of the vehicle. For example, the actuators 114 may include a steering actuator 116a, an accelerator actuator 116b, and a brake actuator 116c. The configuration of the actuators 116a-116c may be according to any implementation of such actuators known in the art of autonomous vehicles.

Figure 2:
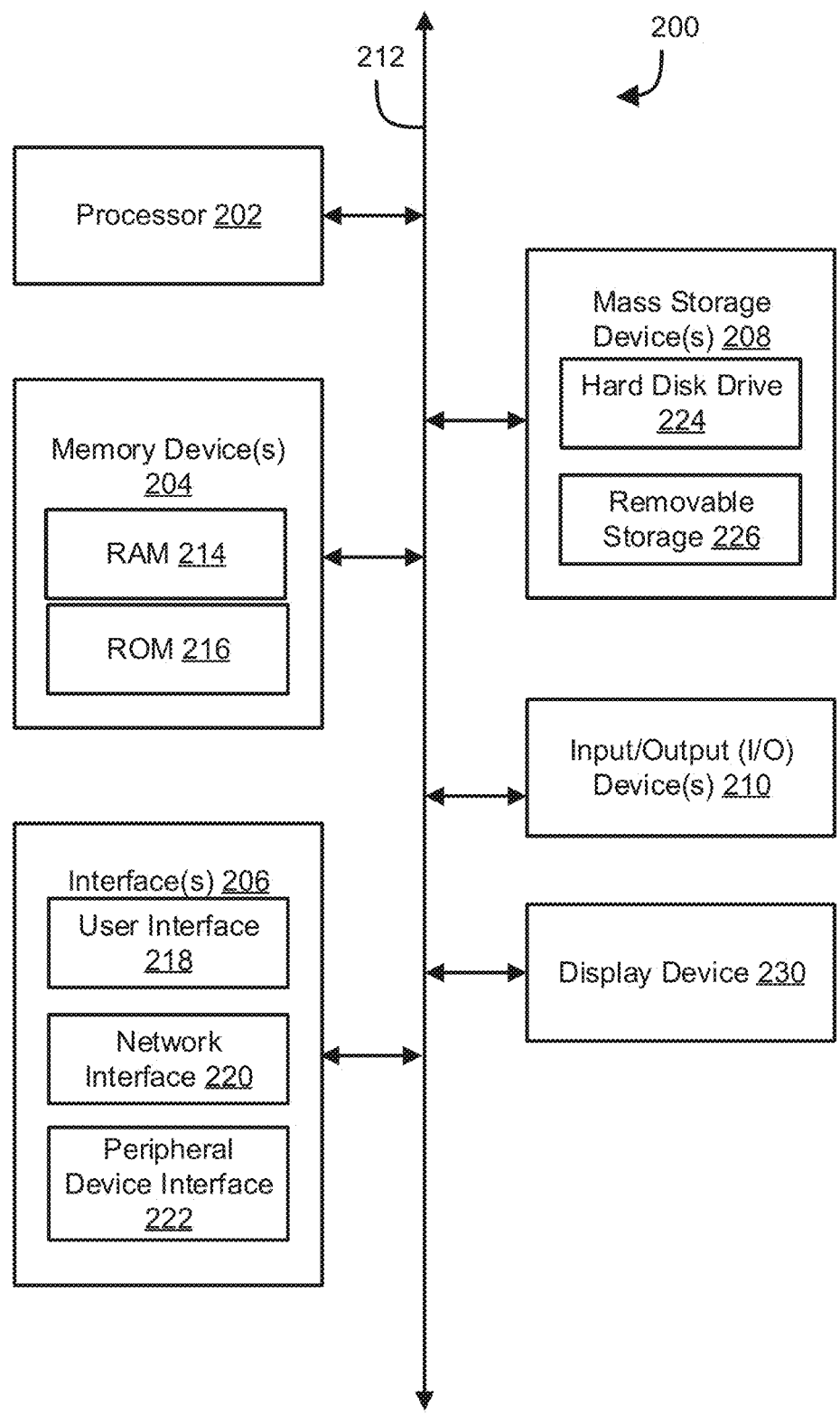
FIG. 2 is a schematic block diagram of an example computing device suitable for implementing methods in accordance with the teachings and principles of the disclosure.

FIG. 2 is a block diagram illustrating an example computing device 200. Computing device 200 may be used to perform various procedures, such as those discussed herein. The controller 102 may have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

To enhance authentication of V2V communications, the systems, methods, and devices disclosed herein provide a cryptographic credential with a physical identity and co-presence component to help infer one's location. A vehicle authentication approach ("VAuth") is disclosed herein and provides for secure authenticated key agreement scheme that addresses the aforementioned concerns for V2V communications while the vehicles are driven on the road. The VAuth approach includes capturing a car's visual contextual information using a camera as a means to bind its physical identity and its co-presence to the other vehicle. Specifically, two moving vehicles on the road would have a unique pair of relative distance (d) and angle ($\Phi$) at a given point of time that no other vehicles can experience.

Figure 3:
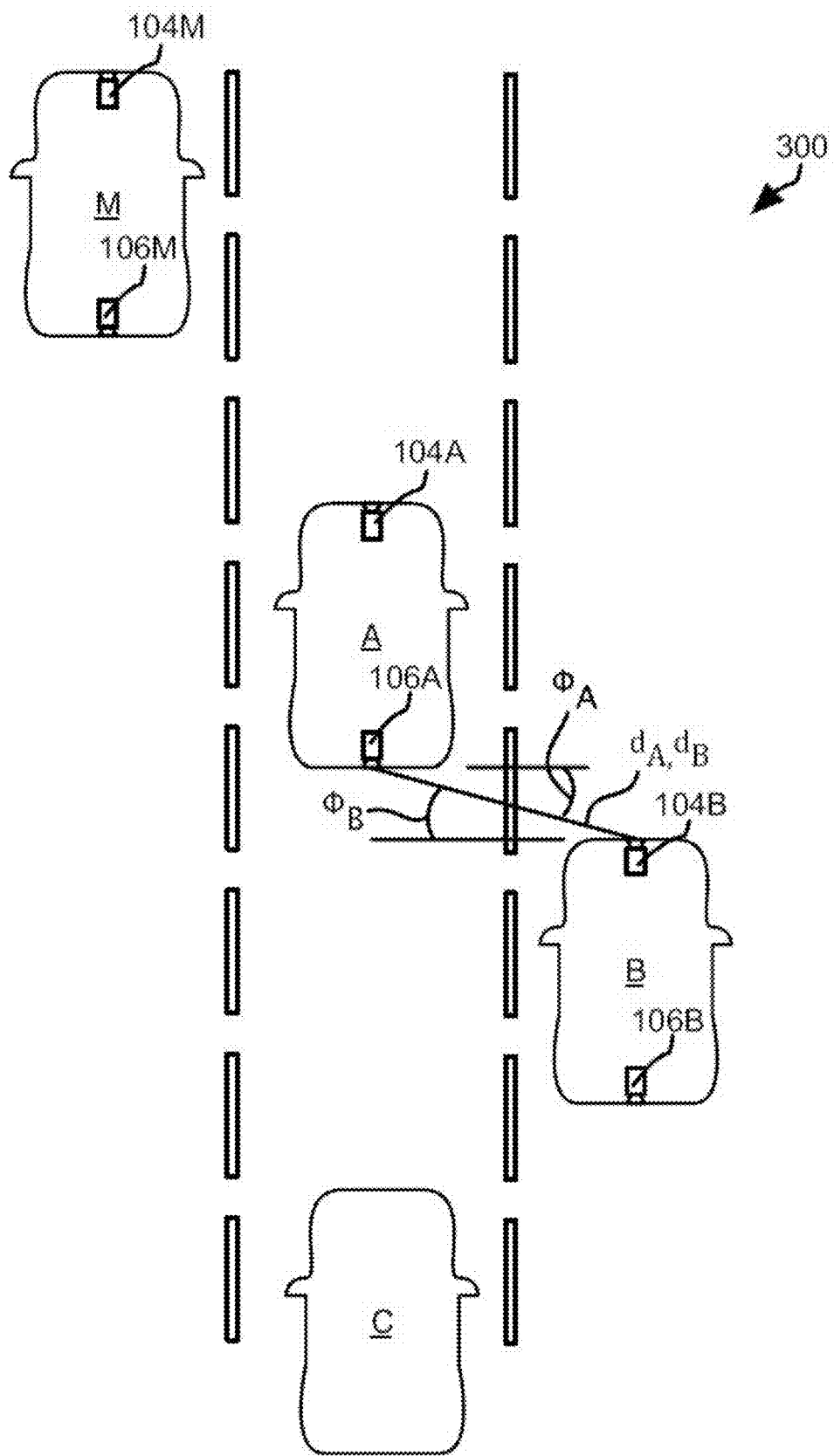
FIG. 3 is a schematic diagram illustrating relative positions of vehicles performing authentication in accordance with the teachings and principles of the disclosure.

For example, FIG. 3 illustrates an embodiment of the use of VAuth 300. In the embodiment, vehicles A and B both take a snapshot of each other simultaneously (e.g. within one second, preferably within 100 ms, more preferably within 10 ms) and exchange the images to prove their relative d and $\Phi$. Specifically, VAuth 300 leverages cryptographic commitment and decommitment schemes to bind the vehicle's cryptographic key with its physical identity (license plate number) and its co-presence (d and $\Phi$), which help to infer the location.

Due to this binding, VAuth 300 eliminates the aforementioned location spoofing impersonation attacks. Through this binding, VAuth 300 is also robust against Man-in-the-Middle (MitM) attacks that may be present during the key agreement steps. In addition, VAuth 300 may also restrict image forgery and spoofing attacks because each vehicle may verify the validity of the received image using commonly observed objects (e.g., neighboring vehicles, road signs, terrains in the background, etc.).

VAuth 300 enables automated key establishment among mobile vehicles even where the following constraints are present. First, there may be a requirement for decentralized trust management making traditional approach of relying on a remote and central trusted third party (TTP) questionable. TTPs incur a large management cost and are vulnerable to a single point of failure. Second, there may be no requirement for human interaction and involvement due to fast dynamics of vehicles moving in traffic. Including drivers and passengers in the loop not only degrades usability but may significantly distract from driving tasks. Third, there may be a requirement to use available hardware in vehicles to keep vehicle costs low.

The main goal of VAuth 300 is to secure against location spoofing impersonation attacks in V2V communications by binding the physical identity and co-presence of the pair of neighboring cars. We define "neighboring vehicles" as vehicles within each other's line of sight (i.e., camera's field of view). In doing so, we enable a pair of vehicles to establish a secure channel by performing an ad-hoc secure key agreement while the vehicles are on the road. This process is referred to as "pairing." The key agreement protocol should be robust against active attacks such as Man-in-the-Middle (MitM) and image spoofing attacks. VAuth 300 augments the integrity and authenticity of key agreement messages. Integrity and authenticity guarantees that the key agreement messages come unaltered en route from the claimed sender.

To summarize, the description of VAuth 300 included herein discloses: (a) a secure V2V key agreement protocol that binds physical identity and presence to a cryptographic key; (b) security analysis of VAuth protocol to demonstrate its robustness against MitM attacks; (c) an implementation and evaluation of VAuth conducted with real-world vehicles.

The attacker's goal is to break the integrity and authenticity of the key agreement scheme between two legitimate vehicles. This application considers both passive and active attackers. Passive attackers merely observe the wireless communication in attempts to launch attacks (e.g., eavesdropping attack). Active attackers may inject, replay, modify, and delete messages in the communication channel. In this application, an approach is disclosed that deals with attackers that are co-located with the legitimate entities, i.e., neighboring vehicles traveling along the road.

VAuth 300 leverages visual images of the vehicles' contextual information to verify authenticity during a pairing process. Any neighboring pair of vehicles and only that neighboring pair of vehicles share and experience a unique relative distance (d) and angle ($\Phi$) at a specific time that no other vehicles experience (where $0 \leq \phi \leq 2\pi$). For example, vehicles A and B in FIG. 3 share a relative distance and angle. Note that it is possible for another pair of vehicles (e.g., vehicles B and C) to have their own d and Φ relative to each other, but it is impossible to have the same d and Φ relative to vehicle A.

The vehicles prove their authenticity by taking camera snapshot of each other to present d and Φ as a proof. The pair of vehicles identify each other as "target" vehicles to pair by initiating periodic beacon messages. The two vehicles exchange beacon messages that contain their identifiers (i.e., license plate number). If the identifiers are not found in each vehicle's local "paired" list, the two vehicles will identify each other as the "target" vehicle to pair.

Referring to FIG. 3 legitimate vehicles A and B may pair using VAuth 300 in the presence of an attacker vehicle M and possibly one or more benign vehicles C. Each vehicle may have a forward-facing camera 104A, 104B, 104M and a rearward facing camera 106A, 106B, 106M.

Vehicles A and B may identify each other as targets for V2V communication. Subsequently, the two vehicles will take a picture of each other and exchange the images over the DSRC wireless channel. Specifically, snapshots taken by vehicle A's rear camera 106A contains vehicle B's front image, and similarly, vehicle B's front camera 104B contains vehicle A's rear image.

If the images are taken by the intended vehicles (and not by a neighboring vehicle), then the images should share the same relative distance, d. Specifically, the distance $d_A$ between vehicles A and B as measured by vehicle A using the image including vehicle B should be equal (i.e. within some tolerance) of the distance $d_B$ measured using the image including vehicle A received from vehicle B, and vice versa. Likewise, the angle $\Phi_A$ between vehicles A and B as measured by vehicle A using the image including vehicle B should be equal (i.e. within some tolerance) of the angle $\Phi_B$ measured using the image including vehicle A received from vehicle B. This constraint may be expressed as $|d_A - d_B| < \epsilon_d$ and $|\phi_A - \phi_B| < \epsilon_\phi$, where $\epsilon_d$ is a distance tolerance and $\epsilon_\phi$ is an angle tolerance. Where this constraint is not met, the pairing process is terminated.

The security of VAuth 300 depends on the uniqueness of the distance ($d_A$, $d_B$) and angle ($\Phi_A$, $\Phi_B$) of a pair of vehicles at a specific point of time. However, consider an attacker, vehicle M, illustrated in FIG. 3, traveling along with vehicles A and B. In order to launch a MitM attack, vehicle M estimates the relative distance ($d_M \approx d_A$) and angle ($\Phi_M \approx \Phi_A$) and impersonates vehicle A to vehicle B by simply spoofing an image of the victim vehicle (vehicle B) with and image from a pool of prepared images with varying distances and angle relative to vehicle B. The attacker can prepare a "dictionary" of images offline, for example, when the victim's vehicle (vehicle B) is parked on a street.

In some embodiments, VAuth 300 prevents such attacks by leveraging the fact that both vehicles' surroundings (e.g., neighboring vehicles, road signs, background objects/views, etc.) should approximately be equal. Hence, VAuth 300 requires Vehicles A and B to take both front ($V_{A_F}$ and $V_{B_F}$) and rear images ($V_{A_R}$ and $V_{B_R}$) as depicted. Each vehicle may therefore compare the images to check if the images contain similar surroundings. For example, $V_{AF}$ and $V_{BF}$ should share common features since they are pointing in the same direction and $V_{AR}$ and $V_{BR}$ should likewise share common features. If this check fails, the vehicles reject the pairing process.

The VAuth 300 protocol includes four phases: (1) synchronization; (2) snapshot; (3) key agreement; and (4) key confirmation phases. Each phase is discussed in detail below with respect to the algorithm of Table 1, below. The definitions of the variables of the algorithm of Table 1 is included in Table 2.

TABLE 1

| VAuth Protocol. |
|---|

| VAuth Protocol |
|---|

| (Phase 1) Synchronization | | | |
|---|---|---|---|
| 1. | A $\xrightarrow{DSRC}$ All | | $BEACON_A = ID_A$ |
| 2. | B | | Checks against "paired" list; Aborts if found. |
| 3. | B $\xrightarrow{DSRC}$ A | | RQST_TO_PAIR |
| 4. | A | | Checks against "paired" list; Aborts if found. |
| 5. | A $\xrightarrow{DSRC}$ B | | $SYNC_{AB}$ |

| (Phase 2) Snapshot | | |
|---|---|---|
| 6. | A $\xleftrightarrow{Cam}$ B | Take snapshots; |
| | A | Front ($V_{A_F}$) and rear ($V_{A_R}$); |
| | B | Front ($V_{B_F}$) and rear ($V_{B_R}$). |

| (Phase 3) Key Agreement | | |
|---|---|---|
| 7. | A $\xrightarrow{DSRC}$ B | $C_A = H(g^a || ID_A || V_{A_F} || V_{A_R})$ |
| 8. | B $\xrightarrow{DSRC}$ A | $C_B = H(g^b || ID_B || V_{B_F} || V_{B_R})$ |
| 9. | A $\xrightarrow{DSRC}$ B | $D_A = g^a || ID_A || V_{A_F} || V_{A_R}$ |
| | B | if verifyCmmt( ) == true, accept $g^a$; Computes shared key $K = (g^a)^b$; Aborts if verification failed. |
| 10. | B $\xrightarrow{DSRC}$ A | $D_B = g^b || ID_B || V_{B_F} || V_{B_R}$ |
| | A | if verifyCmmt( ) == true, accept $g^b$ Computes shared key $K' = (g^b)^a$; Aborts if verification failed. |

| (Phase 4) Key confirmation (check $K \stackrel{?}{=} K'$) | | |
|---|---|---|
| 11. | A | $n_A \xleftarrow{R} \{0,1\}^n$. |
| | A $\xrightarrow{DSRC}$ B | $n_A || M_K(n_A)$ |
| 12. | B | $n_b \xleftarrow{R} \{0,1\}^n$. |
| | B $\xrightarrow{DSRC}$ A | $n_B || M_K(n_A || n_B)$ |
| 13. | A | $M_K(n_A || n_B) \stackrel{?}{=} M_{K'}(n_A || n_B)$; |
| | A $\xrightarrow{DSRC}$ B | $M_{K'}(n_B)$ |
| 14. | B | $M_K(n_B) \stackrel{?}{=} M_{K'}(n_B)$; Aborts if confirmation fails. |

TABLE 2

Notations for VAuth protocol.

| Notation | Description |
| --- | --- |
| DSRC | In-band wireless Dedicated Short-Range Communication channel |
|  | Camera snapshot of each other |
| $M_K(x)$ | MAC (e.g., HMAC) computed over the input x, using key K |
| $g^x$ | Diffie-Hellman public parameter (omit mod p for brevity) |
| $H(x)$ | Cryptographic hash (e.g., SHA-3) of input x |
| $\{0, 1\}^i$ | Random binary string with length i |
| $V_{X_F}$ | Front snapshot image taken by Vehicle X |
| $V_{X_R}$ | Rear snapshot image taken by Vehicle X |

In the synchronization phase, each vehicle transmits a periodic beacon message to attempt to initiate VAuth 300 protocol. The beacon message is simply a broadcast of its vehicle identifier (i.e., license plate number, $ID_A$, $ID_B$). Continuing with the example of FIG. 3, vehicle A broadcasts its beacon message, $BEACON_A$, and vehicle B receives this message as depicted in Table 1. Upon receiving $BEACON_A$, vehicle B checks against its "paired" list. If $ID_A$ is not found in the list, vehicle B sends a request to pair to vehicle A. Similarly, vehicle A also checks the license plate of vehicle B ($ID_B$) against its "paired" list (Steps 2-4 of Table 1). If not found, vehicle A transmits a synchronization message to vehicle B to initiate a synchronized snapshot phase so that both vehicles identify each other as a "target" vehicle to pair with (Step 5 of Table 1). Note that the protocol can be further modified so that if a vehicle receives multiple pairing requests, the vehicle can prioritize the requests using other information sent together with the requests (e.g., GPS-location information to prioritize requests based on the proximity of two vehicles).

In the snapshot phase, following the synchronization phase, and in response to the messages received during the synchronization phase, both vehicle A and vehicle B simultaneously take snapshots of the front and rear views as shown in Step 6 of Table 1. Front and rear images taken by vehicles A and B are referenced as $V_{A_F}$ and $V_{A_R}$, and $V_{B_F}$ and $V_{B_R}$, respectively. Synchronized taking of photos may be performed by vehicles A and B coordinating a time at which photos will be taken.

Figure 4A:
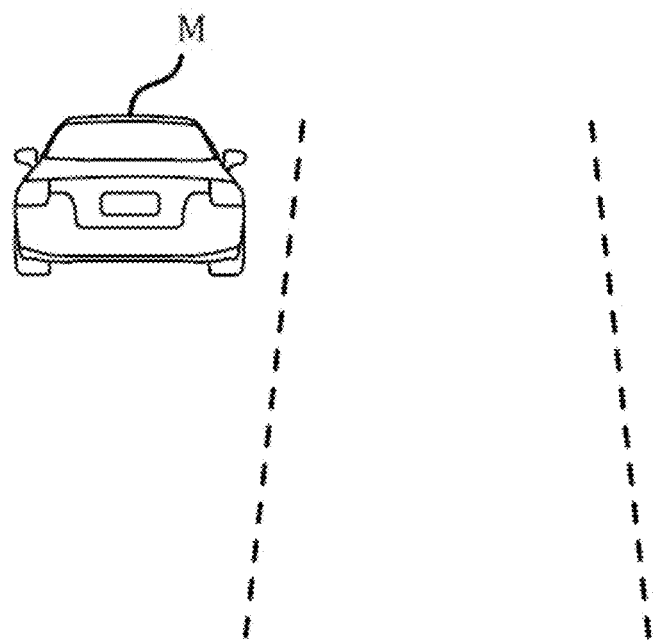
FIGS. 4A, 4B, 5A and 5B are diagrams of images that may be processed in accordance with the teachings and principles of the disclosure.
Figure 4B:
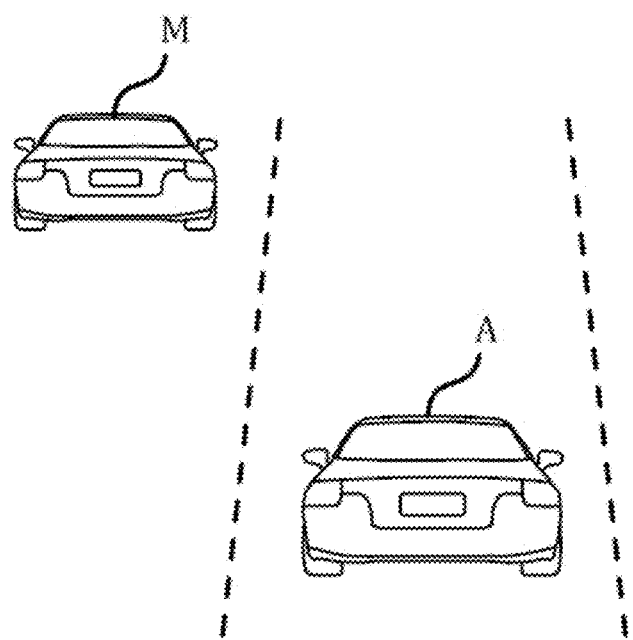
Figure 5A:
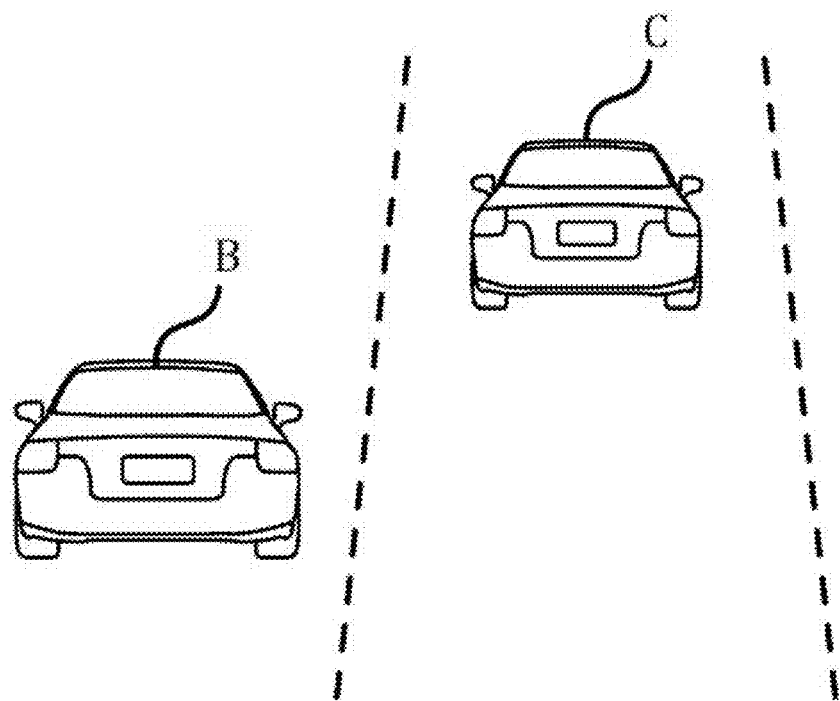
Figure 5B:
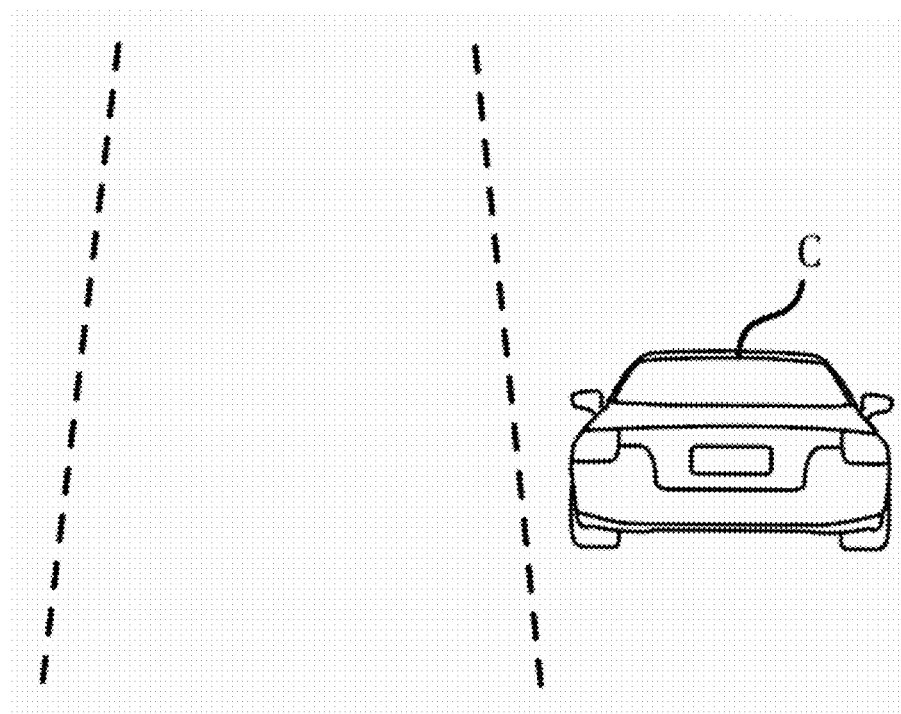

FIGS. 4A and 4B illustrate $V_{A_F}$ and $V_{B_F}$, respectively, for the scenario of FIG. 3. FIGS. 5A and 5B illustrate $V_{A_R}$ and $V_{B_R}$ for the scenario of FIG. 3.

In the key agreement phase, vehicles A and B first exchange their commitments ($C_A$ and $C_B$) and later reveal their decommitments ($D_A$ and $D_B$). Each vehicle leverages commitments to bind the Diffie-Hellman (DH) public parameters ($g^a$ or $g^b$) with the vehicle ID ($ID_A$ or $ID_B$), which is the license plate number, and the physical co-presence via images ($\{V_{A_F}\|V_{A_R}\}$) or ($\{V_{B_F}\|V_{B_R}\}$). Note that we omit mod p for brevity for all DH (Diffie-Hellman) public parameters, however mod p may still be used. Steps 7-8 of Table 1 depict the exchanges of commitments. Subsequently, the vehicles exchange decommitments as depicted in Steps 9-10 of Table 1 to disclose their committed information to each other.

Upon receiving the decommitments, each vehicle performs verification. Table 3 depicts the logic of vehicle B verifying the decommitment ($D_A$) it received from vehicle A. First, vehicle B verifies if $D_A$ is indeed the hash of $C_A$ (Lines 2-5 of Table 3). If true, vehicle B finds out which image (front or back) contains the target vehicle's license plate number (Lines 7-9 of Table 3). For example, $V_B$ should be assigned to $V_{B_F}$ because the image $V_{B_F}$ contains vehicle A's license plate ($ID_A$) because vehicle A is in front of vehicle B.

TABLE 3

Pseudocode of Commitment Verification
Algorithm 1 Pseudocode of commitment verification by
Car B in VAuth protocol depicted in FIG. 4 Step 9.

```
 1:  procedure VERIFYCMMT(C_A, D_A, V_{B_F}, V_{B_R})
 2:     ▷ Returns FALSE if D_A is not decommitment of C_A
 3:     if C_A! = H(D_A) then
 4:        return FALSE
 5:     end if
 6:
 7:     ▷ Finds which image contains the target vehicle's ID
 8:     V_B ← whichImageContainsID(V_{B_F}, V_{B_R}, ID_A)
 9:     V_A ← whichImageContainsID(V_{A_F}, V_{A_R}, ID_B)
10:
11:     ▷ Computes relative distance and angle from images
12:     D_{V_B} ← computeDistance(V_B, ID_A)
13:     φ_{V_B} ← computeAngle(V_B, ID_A)
14:     D_{V_A} ← computeDistance(V_A, ID_B)
15:     φ_{V_B} ← computeAngle(V_A, ID_B)
16:
17:     ▷ Returns FALSE if the check for D_B and φ_B fail
18:     if ((D_{V_A} - ε_D <= D_{V_B} <= D_{V_A} + ε_D) &&
              (φ_{V_A} - ε_φ <= φ_{V_B} <= φ_{V_A} + ε_φ)) then
19:        return FALSE
20:     end if
21:     ▷ Returns FALSE if the check for D_A and φ_A fail
22:     if ((D_{V_B} - ε_D <= D_{V_A} >= D_{V_B} + ε_D) &&
              (φ_{V_B} - ε_φ <= φ_{V_A} = φ_{V_B} + ε_φ)) then
23:        return FALSE
24:     end if
25:
26:     ▷ Returns FALSE if spoofing attack suspected
27:     if (spoofingAttackDetected(V_{A_F}, V_{B_F}) ||
              spoofingAttackDetected(V_{A_R}, V_{B_R})) then
28:        return FALSE
29:     end if
30:
31:     ▷ Successfully verified
32:     return TRUE
33:  end procedure
```

Subsequently, vehicle B continues to verify the relative distance and angle of vehicles A and B (Lines 11-15 of Table 3). It does so by computing the distance and angle from the images, $V_B$ and $V_A$. Hence $D_{V_B}$ and $\phi_{V_B}$ are relative distance and angle of vehicle B to the position of Vehicle A's license plate ($ID_A$). Similarly, $D_{V_A}$ and $\phi_{V_A}$ corresponds to those of vehicle A to the position of vehicle B's license plate ($ID_B$). If the pair of relative distances, $\{D_{V_B} \text{ and } D_{V_A}\}$, and angles, $\{\phi_{V_B} \text{ and } \phi_{V_A}\}$, are not within an error bound, vehicle B aborts the pairing process (Lines 17-24 of Table 3). Potential image spoofing attacks are also detected by vehicle B (Lines 26-31 of Table 3). A pair of images facing the same direction (i.e., front=$\{V_{A_F}, V_{B_F}\}$ and rear=$\{V_{A_R}, V_{B_R}\}$ is input to spoofingAttackDetected( ) function to test if the snapshots are indeed taken by Vehicles A and B simultaneously. As discussed earlier, this check may involve checking the similarity of the surroundings in each image.

Once vehicle B successfully verifies the decommitment of A ($D_A$), vehicle B accepts vehicle A's DH parameter, $g^a$, and computes a shared symmetric key, $K=(g^a)^b$. Similarly, vehicle A also verifies decommitment of Vehicle B ($D_B$) and if verification succeeds, computes a shared symmetric key, $K'=(g^b)^a$.

In the key confirmation phase, upon computing the shared symmetric key, vehicles A and B perform key confirmation to verify that both cars indeed generated the same key. This is depicted in Steps 11-14 of Table 1. Vehicle A transmits to vehicle B a randomly generated η bit nonce, $\eta_A$ (η=256), and its Message Authentication Code (MAC) computed with the derived symmetric key, K'. (Note that in this example, HMAC-SHA-3 is used with a 256 hash bit length, but other hash functions can also be used.) Upon receiving the message, vehicle B first verifies the MAC using its derived symmetric key, K. If successful, vehicle B also transmits to vehicle A its randomly generated η bit nonce (η=256), $\eta_B$, along with a MAC computed over $\eta_A \| \eta_B$ using its symmetric key, K'. Vehicle A verifies the MAC and if successful, sends a final MAC computed over $\eta_B$ it received with the key, K', to vehicle B. Finally, VAuth 300 protocol finishes with vehicle B's successful MAC verification. Vehicles A and B now use the generated shared symmetric key as their session key.

In an embodiment, the attacker's success probability is estimated starting from a random guessing attack without any previous knowledge to a sophisticated image spoofing attack. A basic attack by an attacker may be performed by a hacker who is in full control of the wireless channel. The attacker tries to impersonate vehicle A to vehicle B and forges the DH public key. In Table 1, steps 7 and 9, vehicle A transmits its commitment and decommitment ($C_A$ and $D_A$) to Car B. Hence, the attacker, vehicle M, first prevents vehicle B from receiving $D_A$ (e.g., by jamming), and sends its own forged $D_{A'} = g^a \| D_A \| V_{A'_F} \| V_{A'_R}$. However, because $C_A$ binds vehicle A's DH public key, $g^a$, together with $ID_A \| V_{A_F} \| V_{A_R}$, the attacker's probability, $P_{CarM}$, in succeeding the attack is equivalent to successfully finding a hash collision. Hence, the success probability of the attacker is bounded by the length of the hash function (256 bits SHA-3) as shown in Equation 1, where l is hash bit length (l=256).

$$P_{CarM} = 2^{-l} \quad \text{Equation 1}$$

Not being able to sufficiently perform a random guess attack, the attacker may try to launch more sophisticated attacks. The attacker tries to forge both the DH public key ($g^a$) as well as the images ($V_{A'_F}$ or $V_{A'_R}$) to successfully impersonate vehicle A to vehicle B such that $C_{A'} = H(g^a \| D_A \| V_{A'_F} \| V_{A'_R})$. It is assumed that the attacker, vehicle M, first prepares a "dictionary" of images of the victim (vehicle B in this example) with varying distances and angles. Vehicle M, selects a prepared image, $V_{M_{d\phi}}$ of vehicle B with corresponding d and ϕ and simply transmits to vehicle B the forged commitment ($C_{A'}$) and decommitments ($D_{A'}$), which includes $V_{M_{d\phi}}$. The attack may be divided into three cases for security analysis as outlined below.

In a first case, Attacker has no knowledge of d and ϕ and VAuth 300 does not check for image spoofing attacks. In this case, it is assumed that the attacker has no knowledge of the relative distance and angle between vehicle A vehicle B. For simpler analysis, we assume that VAuth 300 protocol does not check for image spoofing attacks (Hence, lines 26-31 of Table 1 may be omitted in this case). In this case, vehicle M needs to randomly guess d' and ϕ' to select an image such that the values are within the error bounds ($\epsilon_d$ and $\epsilon_\phi$). Hence, the attacker's success probability is as shown in Equation 2, where $d_{max}$ is the maximum distance of visible range, which depends on the capability of a camera.

$$P_{CarM} = \frac{2\epsilon_\phi}{2\pi} \cdot \frac{2\epsilon_d}{d_{max}} \quad \text{Equation 2}$$

In a second case, the attacker has knowledge of d and ϕ and the VAuth 300 protocol does not check for image spoofing attacks. The attacker is assumed to be traveling along with vehicles A and B, and hence capable of determining an estimated distance and angle, d and ϕ.

Figure 6:
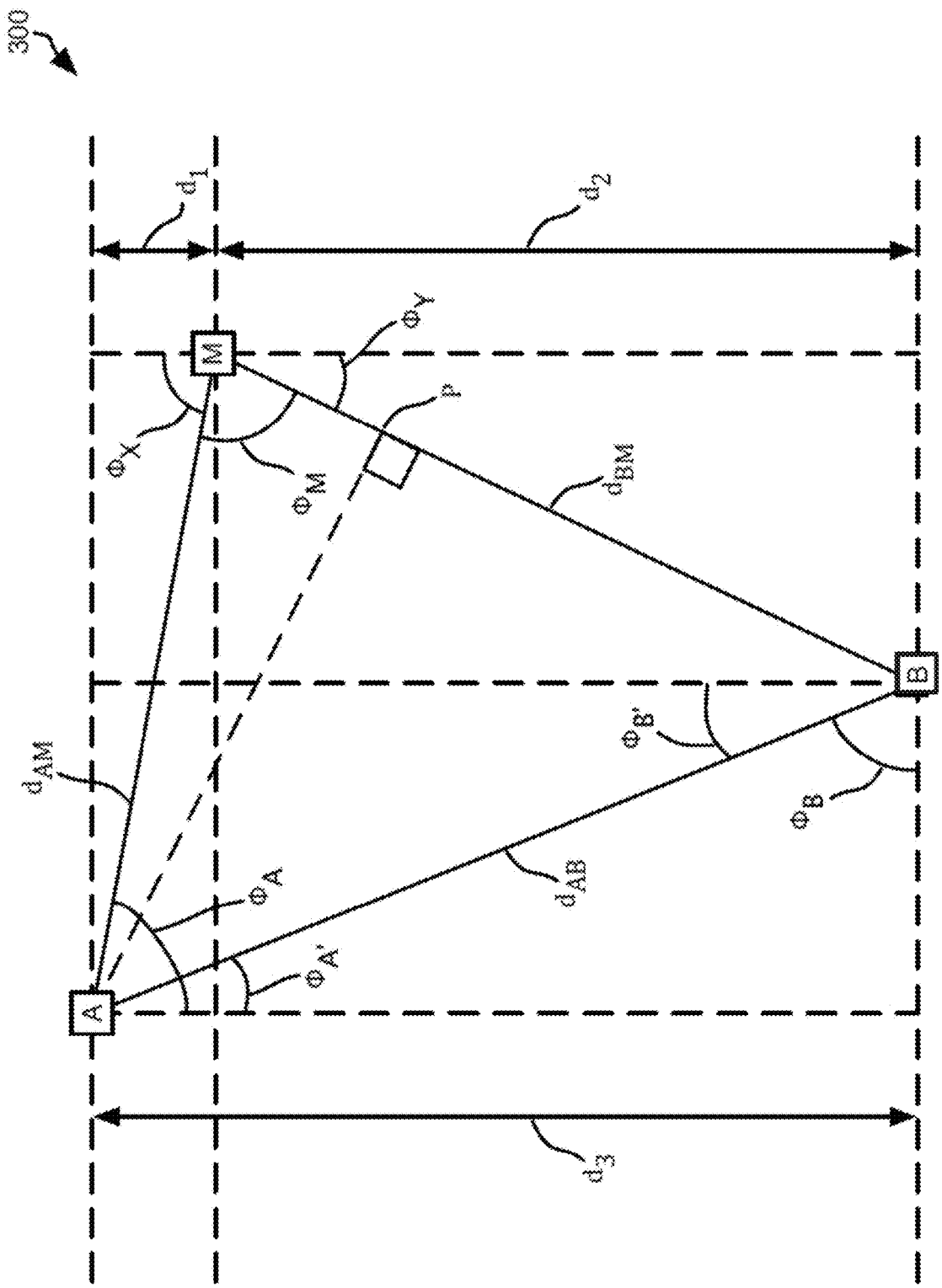
FIG. 6 is a diagram illustrating distances and angles between vehicles performing authentication in accordance with the teachings and principles of the disclosure.

FIG. 6 illustrates this scenario, where Car M attempts to find out the relative distance, $d_{AB}$, and the angle, $\phi_A$, $\phi_B$. Vehicle M knows its relative distance to vehicles A and B ($d_{AM}$ and $d_{BM}$) and the relative angles ($\phi_X$, $\phi_Y$, $\phi_M$). Using simple trigonometry, vehicle M computes the distance and angle as shown in Equation 3 and Equation 4. In Equations 3 and 4, distances specified as $d_{xy}$ are defined as the distance between points x and y. Hence, the probability of the attacker succeeding is always ($P_{CarM} = 1$).

$$d_{AB} = \sqrt{d_{AP}^2 + d_{BP}^2} \quad \text{Equation 3}$$
$$= \sqrt{d_{AP}^2 + (d_{BM} - d_{BM})^2}$$
$$= \sqrt{(d_{AM} \cdot \sin\phi_M)^2 + (d_{BM} - d_{AM} \cdot \cos\phi_M)^2}$$

$$\phi_A(=\phi_B) = \frac{\pi}{2} - \phi_{A'}\left(=\frac{\pi}{2} - \phi_{B'}\right) \quad \text{Equation 4}$$
$$= \frac{\pi}{2} - \arccos\left(\frac{d_3}{d_{AB}}\right)$$
$$= \frac{\pi}{2} - \arccos\left(\frac{d_1 + d_2}{d_{AB}}\right)$$
$$= \frac{\pi}{2} - \arccos$$
$$\left(\frac{(d_{AM} \cdot \cos\phi_x) + (d_{BM} \cdot \cos\phi_y)}{d_{AB}}\right)$$

In a third case, an attacker has knowledge of d and ϕ and VAuth 300 checks for image spoofing attacks. In order to prevent the attacker from successfully launching the attack as shown in the second case, VAuth 300 includes verification steps for image spoofing attacks (Table 1, lines 26-31). Equation 5 depicts that the success probability of the attacker is equivalent to the success probability of succeeding in an image spoofing attack, $P_{spoofing}$.

$$P_{success} = P_{spoofing} \quad \text{Equation 5}$$

To detect the image spoofing attack (Attacker Type 1), VAuth 300 leverages commonly seen objects (e.g., common neighboring cars' license plates). Vehicle B searches for neighboring vehicles' license plates from the image pair $\{V_{A_F}, V_{B_F}\}$ and $\{V_{A_R}, V_{B_R}\}$. If the numbers are less than a predefined threshold value, protocol is aborted. The similarity of other objects and their relative location can also be used to increase the verification accuracy. For example, buildings, road signs, trees, terrain, etc. can also be used.

An example implementation of VAuth 300 uses license plate recognition from the images taken by vehicle cameras. In particular, VAuth 300 may use OpenALPR, an open-source library for automatic license plate recognition. OpenALPR takes an input image and traverses through eight phases to output recognized license plate numbers, location (corners, width, and height) and confidence level (percentage). OpenALPR implements the following phases. Phase 1 ("Detection Phase") finds "potential regions" of license plates. Subsequent phases will process all of the potential regions. Phase 2 ("Binarization Phase") creates multiple black and white images of plate regions to increase recognition accuracy. Phase 3 ("Character Analysis") finds regions or blobs of license plate number/character sizes from plate regions. Phase 4 ("Plate Edges") detects possible edges of license plates by detecting hough lines. Phase 5

("Deskew") corrects the rotation and skew of the license plate image. Phases 6 and 7 ("Character Segmentation" and "OCR") isolate characters of the license plate and perform character recognition and confidence level determination. Finally, Phase 8 ("Post Processing") outputs a list of n potential candidate license plate numbers sorted with their confidence level.

In an embodiment, in order to compute the distance and angle from an output of the OpenALPR, systems and methods of the disclosure utilize techniques for image rectification and perspective correction in computer vision. The algorithm leverages the ratio of real-world object in meters ("world-plane") to pixels ("image-plane") by leveraging dimensional knowledge of known objects. Similarly, a calibrated image is taken, $V_{calibration}$, which is a snapshot of the vehicle's license plate taken at a meter distance, $d_{init}$, away from the vehicle, or some other known distance. From $V_{calibration}$, the height (in pixels), $h_{init}$, of the recognized license plate box. The distance to a license plate in other images can be computed from the ratio of the height of the recognized license plate as shown in Equation 6.

$$d_{image} = d_{init} \cdot \frac{h_{init}}{h_{image}} \quad \text{Equation 6}$$

Note that different vehicles may be equipped with different types of camera, resulting in $h_{init}$ values that are varying between cameras. However, each car can include their $h_{init}$ values in the commitment/decommitment messages.

Figure 7A:
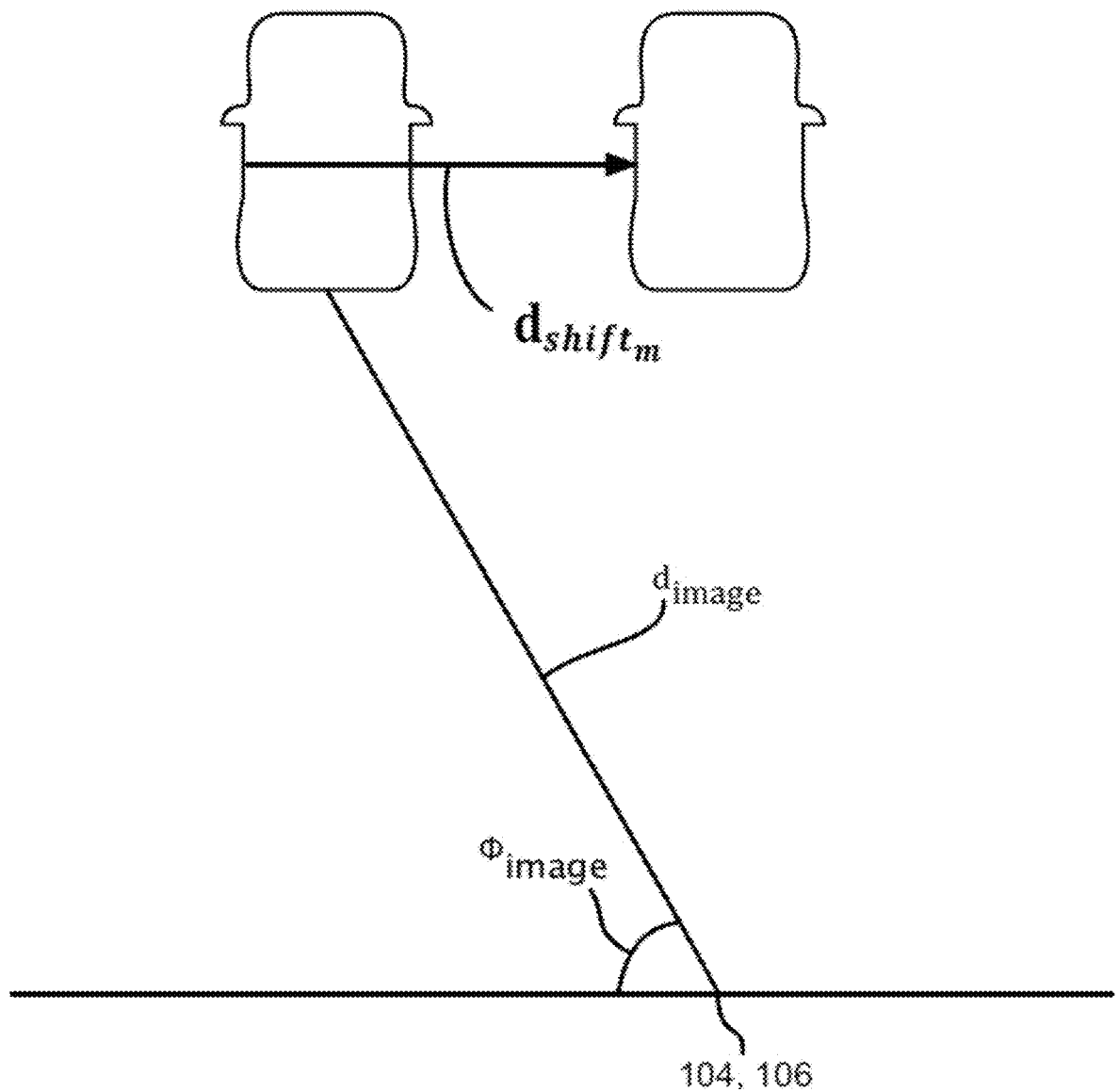
FIG. 7A is a diagram illustrating distances and angles measured from a vehicle camera in accordance with the teachings and principles of the disclosure.
Figure 7B:
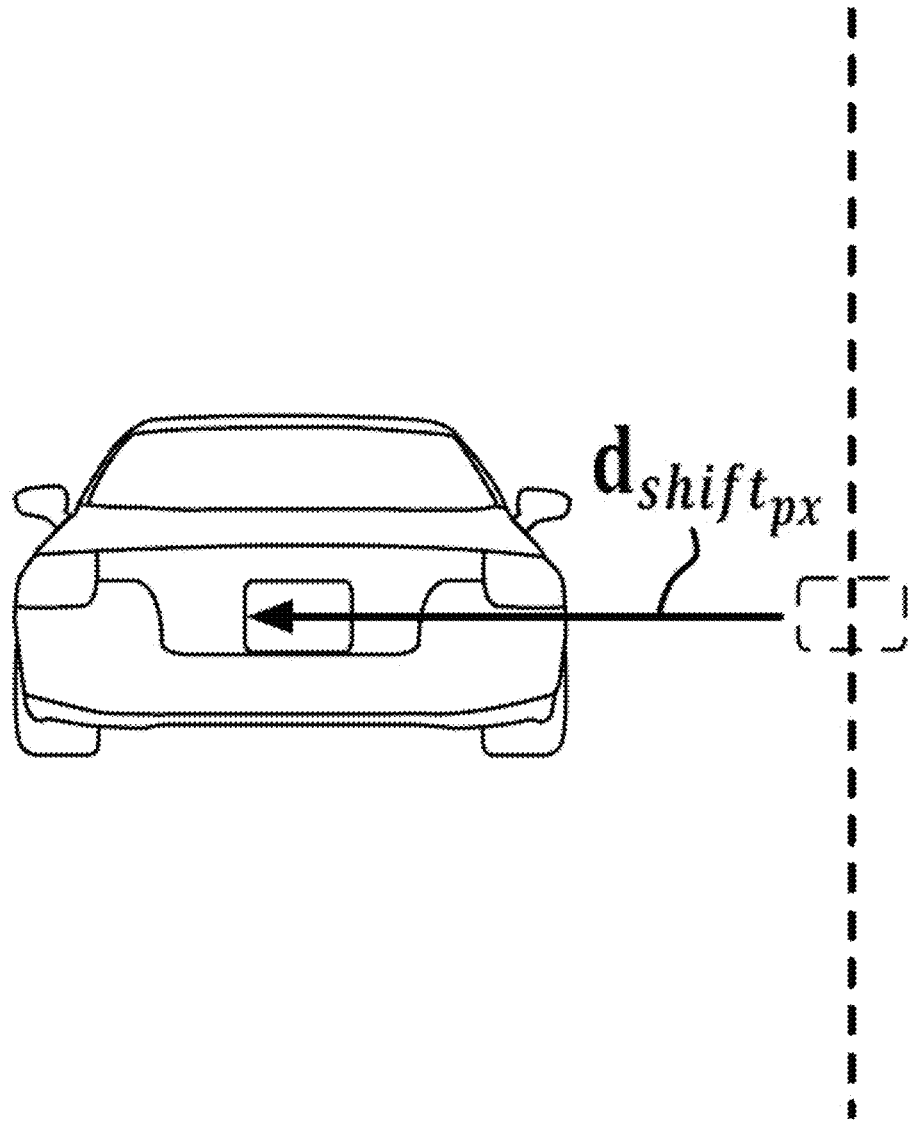
FIG. 7B is a diagram illustrating the location of a vehicle license plate in an image in accordance with the teachings and principles of the disclosure.

The angle may be computed using the known distances from the image. The problem of finding the relative angle is exemplified in FIGS. 7A and 7B. Specifically, the angle can be derived by using two distances, $d_{image}$ and $d_{shiftm}$ in meters as shown in Equation 7. As illustrated in FIG. 7B, $\phi_{image}$ is the angle to the license plate compute and $d_{image}$ is the distance from the camera 104, 106 to the license plate, $d_{image}$.

$$\phi_{image} = \arccos\left(\frac{d_{image}}{d_{shift}}\right) \quad \text{Equation 7}$$

The value $d_{shift}$ is the "imaginary" distance in meters that the car would have shifted horizontally if the car were originally on the same line as the camera, i.e. horizontally centered in the field of view of the camera. To find $d_{shift_m}$, the ratio of the pixels to meters is obtained using an object of known dimensions in meters and pixels. For this object, the license plate is again used. $h_m$ is the height of the actual license plate in meters, which is 0.15 meters (for example, California license plates have the dimension of 6"×12" (0.15 m×0.3 m)). The value $h_{px}$ is the height in pixels of the license plate from the image. From FIG. 7A, one may also find $d_{shift_{px}}$, which is the shift distance in pixels. Finally, using Equation 8, $d_{shift_m}$ is derived.

$$d_{shift_m} = h_m \cdot \frac{d_{shift_{px}}}{h_{px}} \quad \text{Equation 8}$$

Although many of the previous examples discuss authenticating using information in or derived from camera images, any type of sensor data may be used to authenticate a vehicle including its relative location to a parent vehicle. In one embodiment, LIDAR, RADAR, SONAR, or other data may be used to detect objects within their respective sensing ranges and determine the relative locations, angles, and the like based on that data. In different embodiments, any type of sensor data may be used alone to verify location or identity, or multiple types of sensor data may be used together to robustly confirm each other as well as any assertions made by a potential V2V communication source. For example, LIDAR or RADAR data may not be able to detect license plate numbers or a color of a vehicle, but they may be used to generate an object map for vehicles surrounding a parent vehicle. In addition to the object map, velocity vectors relative to the parent vehicle for each object can be determined. These object maps and/or velocity vector maps can be compared to those obtained based another vehicle sensor data to determine if that other vehicle may be trusted for V2V communication.

Figure 8:
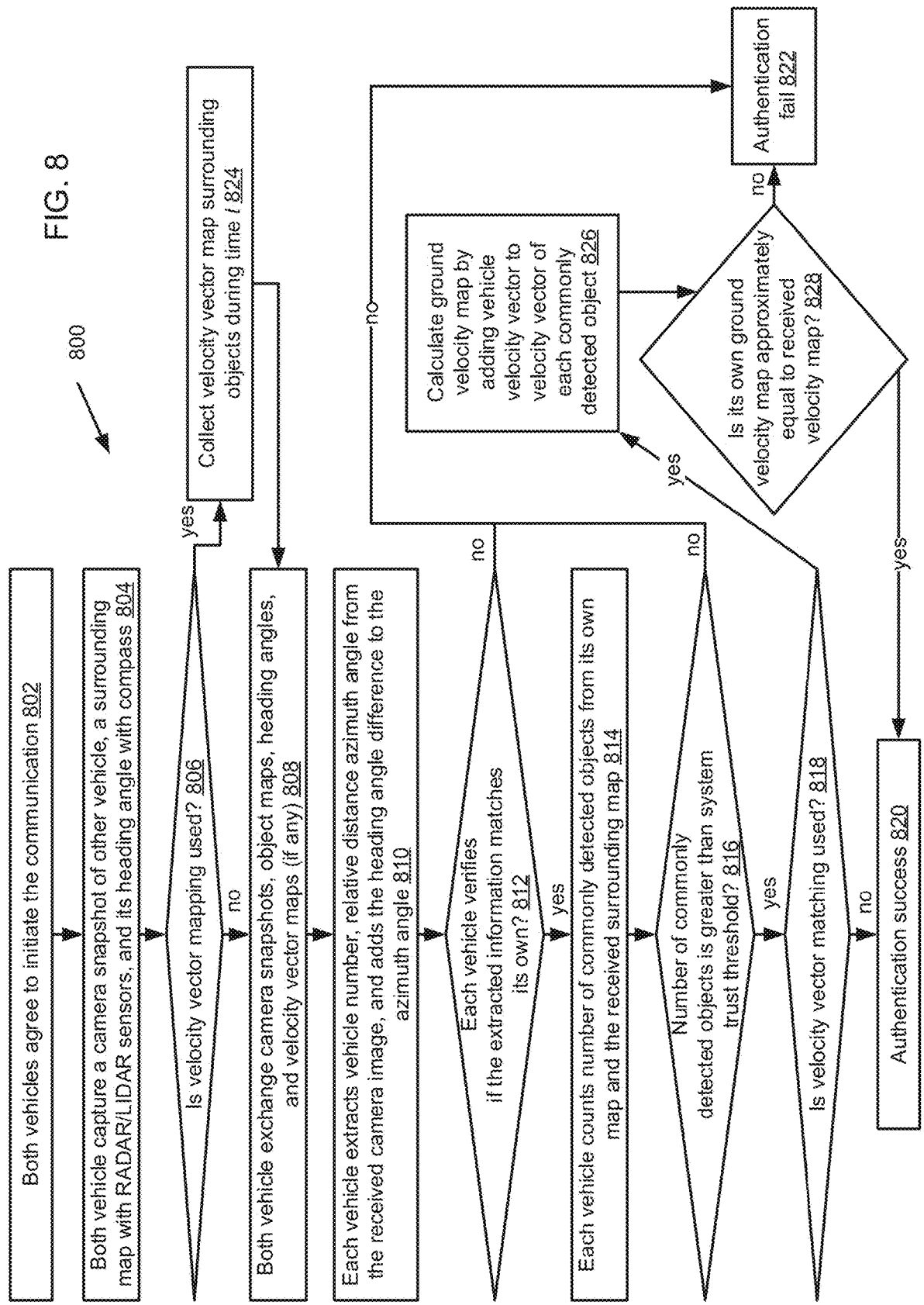
FIG. 8 is a schematic block diagram illustrating a process flow for authenticating a vehicle in accordance with the teachings and principles of the disclosure.

FIG. 8 is a schematic flow chart diagram illustrating a method 800 for authenticating a vehicle based on camera images, object maps, heading angles, and/or velocity vector maps. The method 800 begins and both vehicles agree to initiate the communication at 802. Both vehicles capture a camera snapshot of the other vehicle, a surrounding map with RADAR/LIDAR sensors, and its heading angle with compass at 804. The vehicles check to see if velocity vector mapping is used at 806. If velocity vector mapping is used as determined at 806, the vehicles collect the velocity vector map of surrounding objects during a time t at 824. Both vehicles exchange camera snapshots, object maps, heading angles, and/or velocity vector maps at 808. Each vehicle extracts vehicle number, relative distance azimuth angle from the received camera image (or other sensor data or object maps) and adds the heading angle difference to the azimuth angle at 810. Each vehicle verifies if the extracted information matches with its own at 812. If the extracted information does not match its own as determined at 812, authentication fails 822. If it does match as determined at 812, each vehicle counts the number of commonly detected objects from its own map and the received object map from the other vehicle at 814. The number of commonly detected objects is compared to see if it meets a system trust threshold (e.g., a percentage of detected objects or an absolute integer value for detected objects) at 816. If the number of commonly detected objects not meet the system trust threshold as determined at 816, authentication fails 822. If the number of commonly detected objects as determined at 816 does meet the system trust threshold, authentication is a success 820 if velocity vector matching is not used at 818. If velocity vector matching is used as determined at 818, the vehicles calculate the ground vehicle velocity map by adding the vehicle velocity vector to the velocity vector of each commonly detected object at 826. The vehicles check to see if their own ground velocity map approximately equals the received velocity maps at 828. If the vehicle's own ground velocity map approximately equals the received velocity maps as determined at 828, authentication succeeds 820. If not, authentication fails 822.

Figure 9:
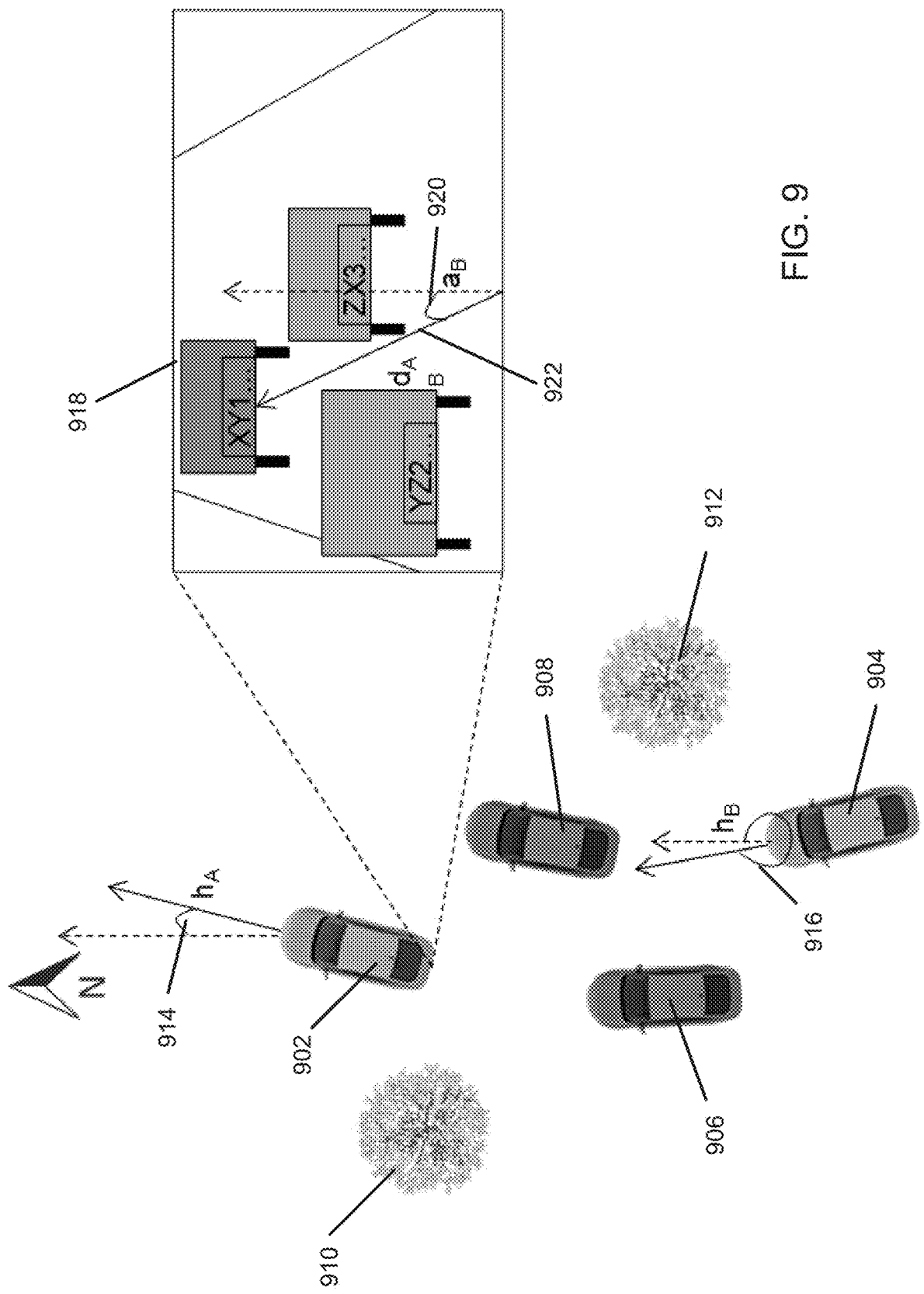
FIG. 9 is a plan view illustrating vehicle positions when an image is captured in accordance with the teachings and principles of the disclosure.

FIGS. 9-12 illustrate how various parameters and comparisons may be performed in order to perform the method of FIG. 8. FIG. 9 is a plan view illustrating relative vehicle positions on a roadway and with nearby objects including other vehicles (vehicle C 906 and vehicle D 908) and roadside objects (object E 910 and object F 912). The heading angle $h_A$ of vehicle A 902 and the heading angle $h_B$ of vehicle B 904 are illustrated. A camera image taken by vehicle A 902 is also illustrated with the relative distance between vehicle A 902 and vehicle B 904 ($d_A$) and the azimuth angle of vehicle B 904 ($a_B$).

Figure 10:
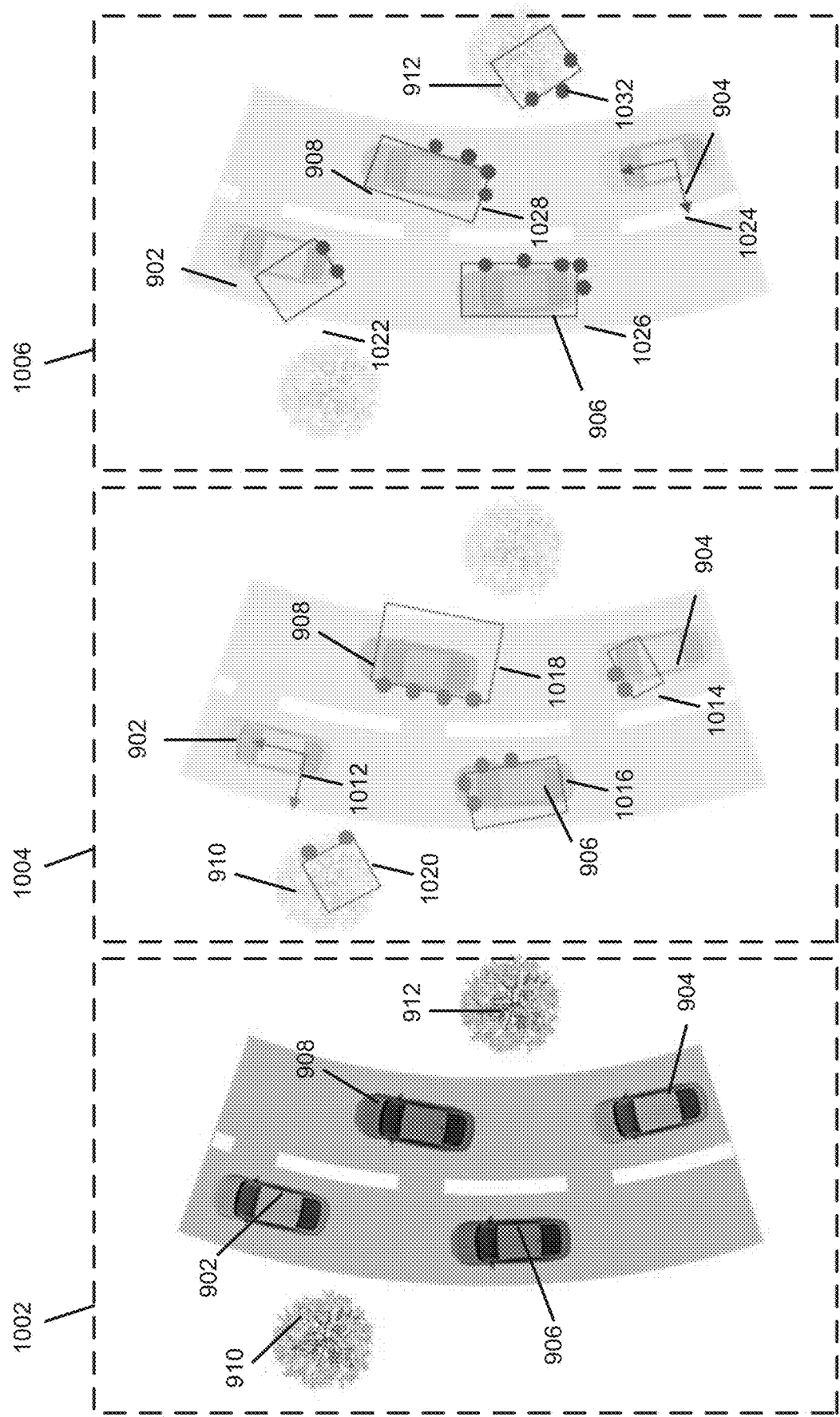
FIG. 10 is a plan view illustrating object maps captured by nearby vehicles in accordance with the teachings and principles of the disclosure.

FIG. 10 is a plan view illustrating a scene 1002 as illustrated in FIG. 9, an ADAS object map 1004 of vehicle A 902, and an ADAS object map 1006 of vehicle B 904. The object map 1004 of vehicle A 902 includes points or locations detected for object E 910, vehicle B 904, vehicle C 906, and vehicle D 908. The object map 1004 includes the azimuth angle 1012 of object A 902, object E points or locations 1020, vehicle B points or locations 1014, vehicle C points or locations 1016, and vehicle D points or locations 1018. The object map 1006 of vehicle B 904 includes points or locations detected for object F 912, vehicle A 902, vehicle C 906, and vehicle D 908. The object map 1006 includes the azimuth angle 1024 of object B 904, vehicle C points or locations 1026, vehicle D points or locations 1028, object F points or locations 1032, and vehicle A points or locations 1022. Note that the object map 1004 of vehicle A 902 does not include object F 912. Note that the object map 1006 of vehicle B 904 does not include object E 910. This illustrates that the object maps 1004, 1006 might not be perfect matches.

Figure 11:
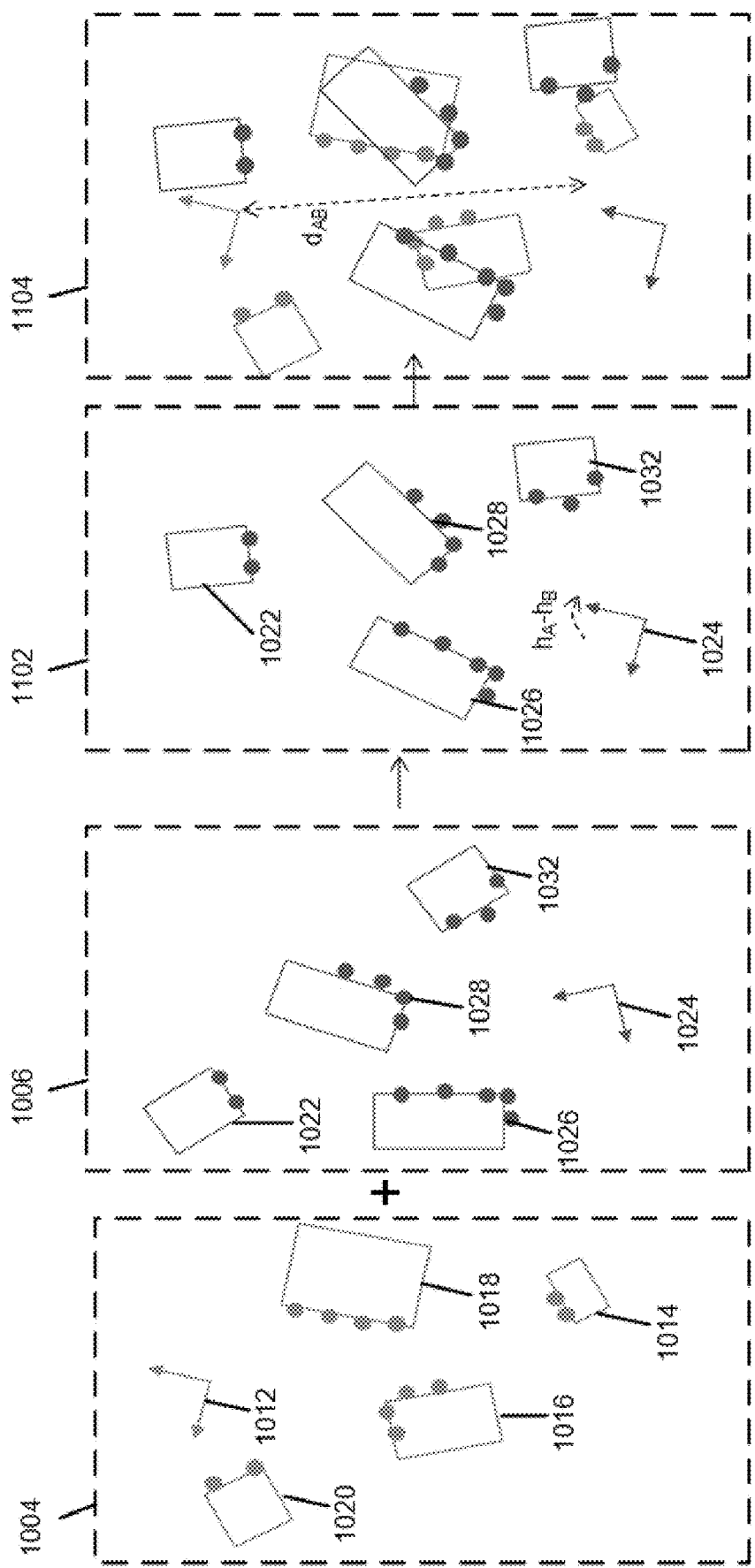
FIG. 11 is a plan view illustrating translation and rotation to determine whether object maps captured by nearby vehicles are similar in accordance with the teachings and principles of the disclosure.

FIG. 11 is a plan view illustrating the resulting object maps as well as rotations and translations to attempt to match or overlap the object map 1004 of vehicle A 902 and the object map 1006 of vehicle B 904. The result of rotating the object map 1006 of vehicle B 904 by $h_A$-$h_B$ is illustrated at 1102. The result of translating the object map 1006 of vehicle B 904 by $d_{AB}$ and overlapping the object map 1006 of vehicle B 904 over the object map 1004 of vehicle A 902 is illustrated at 1104. An object map may be rotated by the difference between the azimuth angles (e.g., $h_A$-$h_B$) and then translated by the distance $d_{AB}$ between the vehicles or vehicle sensors that were used to create the object maps. The number or percentage of matching objects can then be determined by counting matching and non-matching objects. As long as the number or threshold exceeds a trust threshold, discrepancies may not cause authentication to fail.

Figure 12:
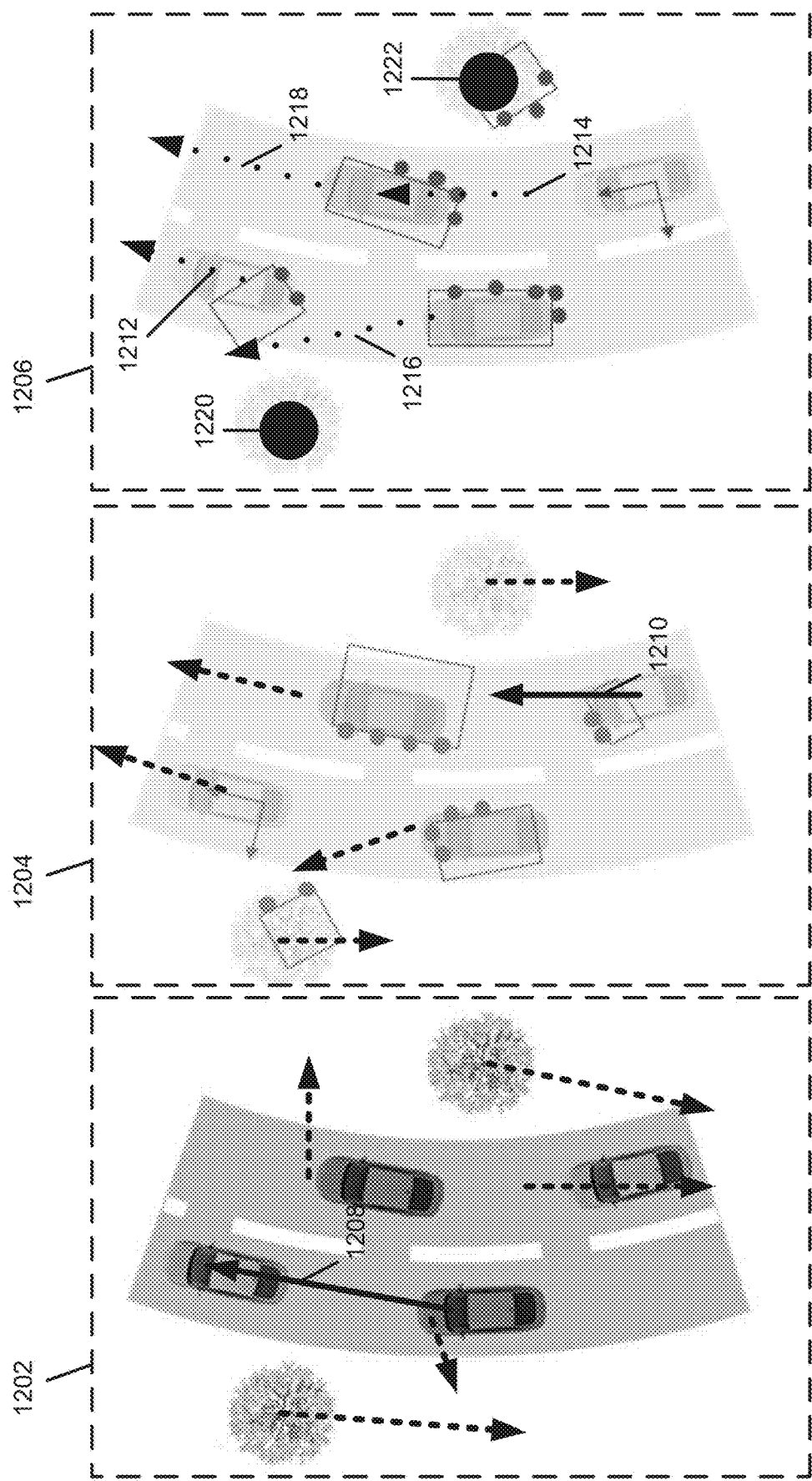
FIG. 12 is a plan view illustrating velocity vector maps of nearby vehicles for use in authentication in accordance with the teachings and principles of the disclosure.

FIG. 12 is a plan view illustrating velocity vector-based matching. FIG. 12 illustrates a vehicle A relative velocity vector map 1202, a vehicle B relative velocity vector map 1204, and a ground velocity vector map 1206. Note that all maps include vector maps for all objects, for illustrative purposes. The velocity vectors for each object may be compared by adding the velocity vector for a vehicle to the velocity vector for an object and determining whether that is sufficiently similar to the result of adding the velocity vector for the other vehicle to the velocity vector for the same object. This may be done for each commonly detected object.

The velocity of vehicle A $V_A$ 1208 is equal to the velocity of vehicle B $V_B$ 1210 when added to a ground velocity vector for an object, according to Equation 9, below.

$$v_A + v_X = v_B + v_X \qquad \text{Equation 9}$$

The ground velocity vectors are illustrated in the ground velocity vector map 1206, including the vehicle A ground velocity vector 121, the vehicle B ground velocity vector 1214, the vehicle C ground velocity vector 1216, the vehicle D ground velocity vector 1218, and object E ground velocity vector 1220, and the object F ground velocity vector 1222. The relative velocities of various vehicle and objects as determined by vehicle A 902 are illustrated in vehicle A relative velocity vector map 1202 as dotted lines. The relative velocities of various vehicle and objects as determined by vehicle B 904 are illustrated in vehicle B relative velocity vector map 1204.

Figure 13:
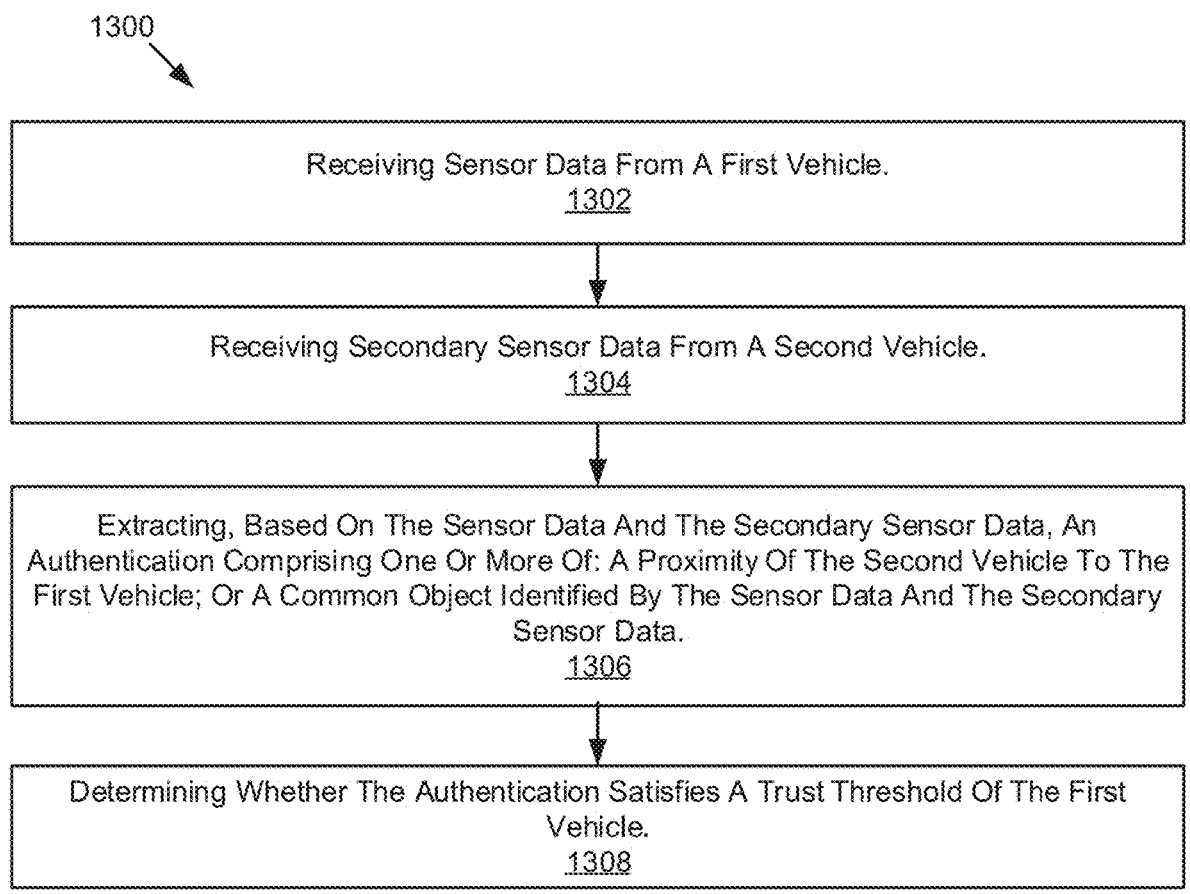
FIG. 13 is a schematic flow chart diagram illustrating a method for authenticating a vehicle, in accordance with the teachings and principles of the disclosure.

FIG. 13 illustrates schematic flow chart diagram a method 1300 for authentication vehicle-to-vehicle communication. The method 1300 may be performed by any suitable computing device, including for example a controller 102 of a vehicle. The method 1300 begins and a computing device receives sensor data from a first vehicle at 1302. The computing device receives secondary sensor data from a second vehicle at 1304. The computing device extracts, based on the sensor data and the secondary sensor data, an authentication comprising one or more of: a proximity of the second vehicle to the first vehicle, or a common object identified by the sensor data and the secondary sensor data at 1306. The computing device determines whether the authentication satisfies a trust threshold of the first vehicle at 1308.

Figure 14:
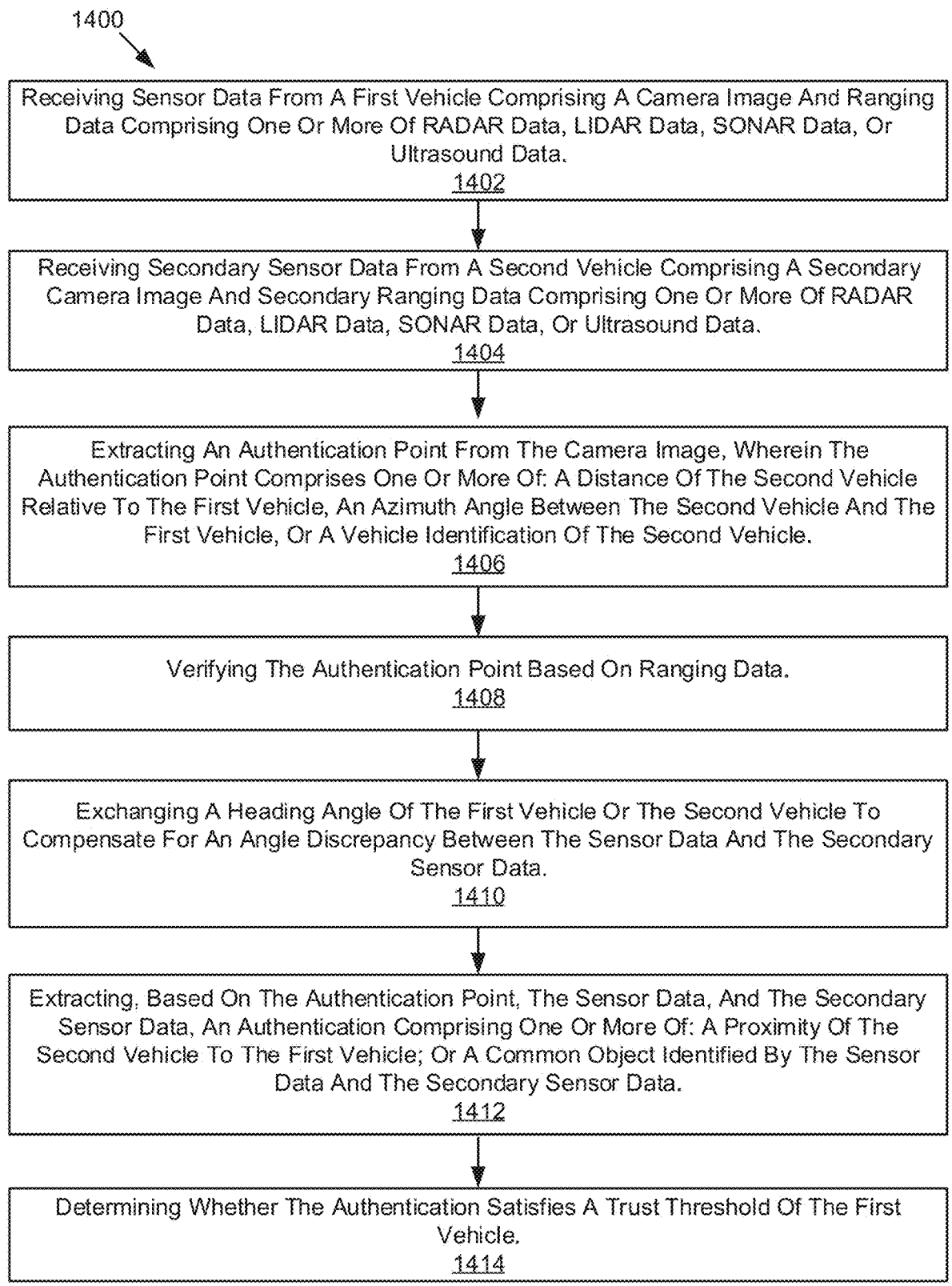
FIG. 14 is a schematic flow chart diagram illustrating a method for authenticating a vehicle, in accordance with the teachings and principles of the disclosure.

FIG. 14 illustrates a schematic flow chart diagram of a method 1400 for authentication vehicle-to-vehicle communication. The method 1400 may be performed by any suitable computing device, including for example a controller 102 of a vehicle. The method 1400 begins and a computing device receives sensor data from a first vehicle comprising a camera image and ranging data comprising one or more of RADAR data, LIDAR data, SONAR data, or ultrasound data at 1402. The computing device receives secondary sensor data from a second vehicle comprising a secondary camera image and secondary ranging data comprising one or more of RADAR data, LIDAR data, SONAR data, or ultrasound data at 1404. The computing devices extracts an authentication point from the camera image, wherein the authentication point comprises one or more of: a distance of the second vehicle relative to the first vehicle, an azimuth angle between the second vehicle and the first vehicle, or a vehicle identification of the second vehicle at 1406. The computing device verifies the authentication point based on ranging data at 1408. The computing device exchanges a heading angle of the first vehicle or the second vehicle to compensate for an angle discrepancy between the sensor data and the secondary sensor data at 1410. The computing device extracts, based on the authentication point, the sensor data, and the secondary sensor data, an authentication comprising one or more of: a proximity of the second vehicle to the first vehicle, or a common object identified by the sensor data and the secondary sensor data at 1412. The computing device determines whether the authentication satisfies a trust threshold of the first vehicle at 1414.

Figure 15:
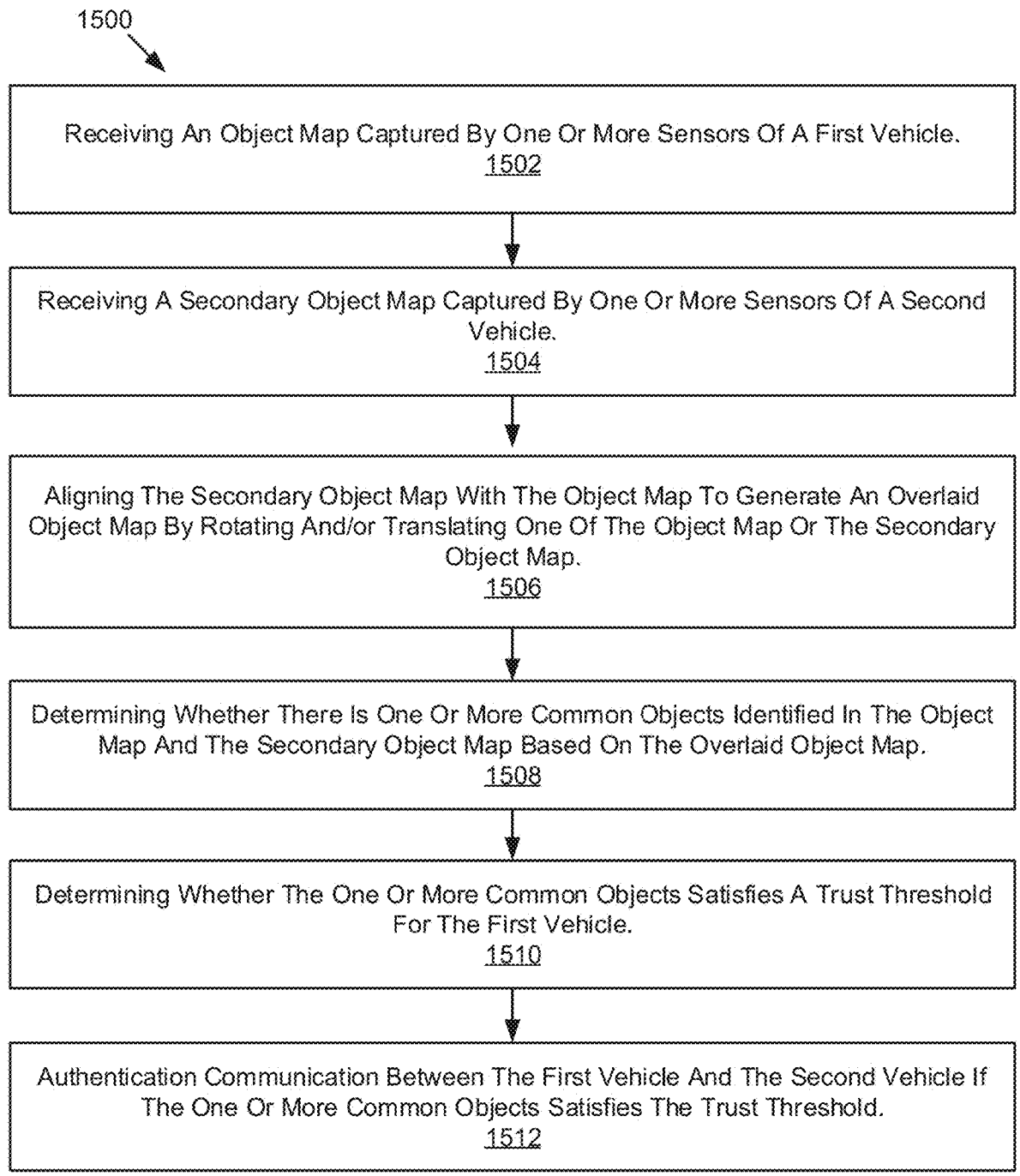
FIG. 15 is a schematic flow chart diagram illustrating a method for authenticating a vehicle, in accordance with the teachings and principles of the disclosure.

FIG. 15 illustrates a schematic flow chart diagram of a method 1500 for authentication vehicle-to-vehicle communication. The method 1500 may be performed by any suitable computing device, including for example a controller 102 of a vehicle. The method 1500 begins and a computing device receives an object map captured by one or more sensors of a first vehicle at 1502. The computing devices receives a secondary object map captured by one or more sensors of a second vehicle at 1504. The computing device aligns the secondary object map with the object map to generate an overlaid object map by rotating and/or translating one of the object map or the secondary object map at 1506. The computing device determines whether there is one or more common objects identified in the object map and the secondary object map based on the overlaid object map at 1508. The computing device determines whether the one or more common objects satisfies a trust threshold for the first vehicle at 1510. The computing device authenticates communication between the first vehicle and the second vehicle if the one or more common objects satisfies the trust threshold at 1512.

Use of sensors in addition to images, or the alternative to images, may help reduce potential attacks. For example, an advanced attacker may able to impersonate a vehicle's identity by preparing a dictionary of images taken from various locations offline and selecting an image from the dictionary to pretend to be other vehicles around the victim vehicle. Or, an attacker might take a snapshot of a victim vehicle, crop out the victim vehicle from the snapshot, and superimpose the victim vehicle into the position to mislead the victim believe that the image is taken from another vehicle. Due to recent advances in computer vision, there will be more camera image modification techniques available to an attacker.

In order to overcome the potential weaknesses in the previous camera image-based V2V authentication, other ADAS sensors that are rapidly becoming prevalent in modern vehicles may be leveraged. These other ADAS sensors (which include RADAR, LIDAR, and other sensors) are able to detect surrounding objects (stationary and/or moving) and can be used to provide an enhanced authentication procedure, as that shown in the process flow 800 of FIG. 8.

Embodiments may still check for the vehicle identity (vehicle number) captured from a camera snapshot. Additionally, a vehicle extracts the relative distance, azimuth angle, and vehicle number from the camera snapshot of the other vehicle. However, to prevent the image modification attack, this information is also cross checked with the information from other ADAS sensors such as RADAR and LIDAR. Although these sensors do not provide the vehicle number information, they still provide the relative distance and azimuth angle of surrounding objects that should be identical with the information from the camera snapshot within an error boundary. In this process, the heading angle of each vehicle may also be exchanged to compensate the angle discrepancy when the two vehicles are not aligned (e.g. in a curved road). The surrounding objects can be stationary (e.g. landmarks, trees, buildings, road signs) or moving (e.g. other surrounding vehicles, and potentially pedestrians).

Referring again to FIGS. 10-11, the vehicle A object map 1004 is illustrated and the vehicle B object map 1006 is illustrated. In order to figure out if the two vehicles are near to each other (to authenticate), an algorithm rotates and/or translates one of the two object maps (the vehicle B object map 1006 as illustrated in FIG. 11) to determine if there is an acceptable match between any of the detected objects.

Due to sensor noise, different sensing capability, obstacles, the detected surrounding objects for two vehicles cannot be the same in practice. Therefore, if the number of commonly detected objects in two vehicles is higher than the system trust threshold, the authentication is granted for the following communication. The system trust threshold can be determined empirically in the surrounding environment. For example, it will be higher in an urban area with high object density compared to a rural area. Other implementations may yield a trust decision choice more to each application layer rather than system layer. As such, with a given number of commonly detected objects in two vehicles some security critical applications do not authenticate the communication with more strict trust boundary, whereas other non-critical applications satisfy with it.

In an implementation, the authentication system can also use the velocity vectors of surrounding objects during a short duration. A vehicle can calculate the ground velocity of surrounding objects by summing its velocity to each object's velocity vector. Comparing the ground velocity vectors of commonly detected objects in two vehicles will make even harder for an attacker to impersonate a vehicle in V2V communication. Compared to authentication based on images only, using the additional ADAS sensor data makes it even harder for an attacker to bypass the V2V authentication system. In such an embodiment, the authentication may comprise an equivalent detected ground speed of a common object as identified by the sensor data and the secondary data.

EXAMPLES

The following examples pertain to further embodiments.

Example 1 is a method that includes receiving sensor data from a vehicle A and receiving sensor data from a vehicle B. Wherein the sensor data includes one or more of RADAR, LIDAR, image, SONAR, ultrasound, or other sensor data. The method includes verifying the vehicle B is proximal to the vehicle A based on the sensor data. For example, the method may include verifying a relative position (distance and/or angle) of the vehicle B to the vehicle A based on the sensor data from a vehicle A and the sensor data from a vehicle B. As another example, the method may include verifying relative positions of objects in a vehicle A object map determined based on the sensor data from a vehicle A and in a vehicle B object map determined based on the sensor data from a vehicle B. As a further example, the method may include verifying determined ground speeds of objects detected based on the sensor data from a vehicle A and the sensor data from a vehicle B. In one embodiment, object maps or vector maps may be exchanged so that each vehicle doesn't have to determine the object map or vector map for the other vehicle.

In Example 2, the method of Example 1 includes verifying may determining that a similarity between an object map, velocity vector, or the like is within a desired threshold.

In Example 3, the method of any of Examples 1-2 includes comparing relative positions determined based on one type of sensor data (e.g., image data) to a relative position based on another type of sensor data (e.g., RADAR or LIDAR) and authenticating if the relative positions are similar enough.

In Example 4, the method in any of Examples 1-3 further includes: determining a vehicle A object map based on the vehicle A sensor data; determining a vehicle B object map based on the vehicle B additional sensor data; and verifying that the vehicle A object map and the vehicle B object map are sufficiently similar. The authenticating the vehicle B includes authenticating in response to verifying that the vehicle A object map and the vehicle B object map are sufficiently similar.

In Example 5, the method of Example 4 includes rotating and/or translating at least one of the vehicle A object map or the vehicle B object map to accommodate different orientations or locations of the vehicle A and the vehicle B.

In Example 6, the verifying that the vehicle A object map and the vehicle B object map are sufficiently similar in any of Examples 4-5 includes determining that a number of commonly detected objects in the vehicle A object map and the vehicle B object map is higher than a system trust threshold.

In Example 7, the method of any of Examples 1-6 includes: determining a ground velocity of one or more objects near vehicle a based on the vehicle A additional sensor data; determining a ground velocity of one or more objects near vehicle B based on the vehicle B additional sensor data; and verifying that the ground velocity of one or more objects near vehicle a and the ground velocity of one or more objects near vehicle B are sufficiently similar.

Example 8 is a method that includes: receiving a first image from a camera of a vehicle A: receiving a second image from a vehicle b; verifying that a relative position of the vehicle B to the vehicle A according to the first image corresponds to a relative position of the vehicle A to the vehicle B according to the second image; and in response to the verifying, authenticating the vehicle B.

In Example 9, the verifying that the relative position of the vehicle B to the vehicle A according to the first image corresponds to the relative position of the vehicle A to the vehicle B according to the second image of Example 8 includes identifying, by the controller of the vehicle A, an image of the vehicle B in the first image and identifying, by the controller of the vehicle A, an image of the vehicle A in the second image. The method includes determining, by the controller of the vehicle A, at least one of a first distance to the vehicle B from the vehicle A and a first angle to the vehicle B from the vehicle A according to a location of the image of the vehicle B in the first image. The method further includes determining, by the controller of the vehicle A, at least one of a second distance to the vehicle A from the vehicle B and a second angle to the vehicle A from the vehicle B according to a location of the image of the vehicle A in the second image. The method further includes determining, by the controller of the vehicle A, at least one of (a) the second distance is within a predetermined distance tolerance from the first distance and (b) the second angle is within a predetermined angle tolerance from the first angle.

In Example 10, the at least one of the first distance to the vehicle B from the vehicle A and the first angle to the vehicle B from the vehicle A according to a location of the image of the vehicle B in the first image in any of Examples 8-9 includes both of the first distance to the vehicle B from the vehicle A and the first angle to the vehicle B from the vehicle A according to a location of the image of the vehicle B in the first image. The at least one of the second distance to the vehicle A from the vehicle B and the second angle to the vehicle A from the vehicle B according to the location of the image of the vehicle A in the second image includes both of the second distance to the vehicle A from the vehicle B and the second angle to the vehicle A from the vehicle B according to the location of the image of the vehicle A in the second image.

In Example 11, the receiving the first image from the camera of the vehicle A in any of Examples 8-10 includes receiving a first forward image from a forward facing camera mounted to the vehicle A and receiving a first rearward image from a rearward facing camera mounted to the vehicle A. The method includes receiving the second image from the vehicle B includes receiving a second forward image from a forward facing camera mounted to the vehicle B and receiving a second rearward image from a rearward facing camera mounted to the vehicle B.

In Example 12, the identifying the image of the vehicle b in the first image in any of Examples 8-11 includes identifying a license plate number of the vehicle B in the first image and wherein identifying the image of the vehicle A in the second image includes identifying a license plate number of the vehicle A in the second image.

In Example 13, the method of Example 12 further includes receiving, by the controller of the vehicle A from the vehicle B, a message including the license plate number of the vehicle B.

In Example 14, the determining the at least one of the first distance to the vehicle B from the vehicle A and the first angle to the vehicle B from the vehicle A according to the location of the image of the vehicle B in the first image in any of Examples 12-13 includes: determining a first dimension ($h_{image}i$) of a license plate of the vehicle B in the first image in pixels; and determining the first distance ($d_1$) as equal to $d_{init}*h_{init}/h_{image1}$, where $d_{init}$ is a calibration distance and $h_{init}$ is a test dimension in pixels of a test license plate positioned at $d_{init}$ from a test camera. Determining the at least one of the second distance to the vehicle A from the vehicle B and the second angle to the vehicle A from the vehicle B according to the location of the image of the vehicle A in the second image includes: determining a second dimension ($h_{image2}$) of a license plate of the vehicle A in the second image in pixels; and determining the second distance ($d_2$) as equal to $d_{init}*h_{init}/h_{image}$.

In Example 15, the determining the at least one of the first distance to the vehicle B from the vehicle A and the first angle to the vehicle B from the vehicle A according to the location of the image of the vehicle B in the first image of Example 14 includes: determining a first pixel offset ($d_{shift1}$) of the license plate of the vehicle B in the first image from a center of the first image in pixels; determine a first distance offset ($d_{shift1m}$) as equal to ($h_m*d_{shift1}/h_{image1}$), where $h_m$ is a measured dimension of a test license plate; and determining the first angle as equal to $Arccos(d_1/d_{shift1m})$. Determining the at least one of the second distance to the vehicle A from the vehicle B and the second angle to the vehicle A from the vehicle B according to the location of the image of the vehicle A in the second image includes: determining a second pixel offset ($d_{shift2}$) of the license plate of the vehicle A in the second image from a center of the second image in pixels; determine a second distance offset ($d_{shift2m}$) as equal to ($h_m*d_{shift2}/h_{image2}$); and determining the second angle as equal to $Arccos(d_2/d_{shift2m})$.

In Example 16, the camera of the vehicle A in any of Examples 8-15 is a first camera. The method further includes authenticating the vehicle B in response to determining that one or more background objects in the second image correspond to objects in an image received from a second camera mounted to the vehicle A and facing in an opposite direction to the first camera.

In Example 17, the authenticating the vehicle B in any of Examples 8-16 includes performing Diffie-Hellman key exchange between the vehicle A and the vehicle B.

In Example 18, the method of any of Examples 8-17 further includes: receiving vehicle A additional sensor data including one or more of RADAR and LIDAR data; and receiving vehicle B additional sensor data including one or more of RADAR and LIDAR data from the vehicle B.

In Example 19, the method of Example 18 includes verifying that the relative position of the vehicle B to the vehicle A according to the vehicle A additional sensor data is similar to a relative position of the vehicle A to the vehicle B according to the vehicle B additional sensor data, and wherein the relative position is within an error boundary of the relative position determined based on the first image and the second image.

In Example 20, the method in any of Examples 18-19 includes: determining a vehicle A object map based on the vehicle A additional sensor data; determining a vehicle B object map based on the vehicle B additional sensor data; and verifying that the vehicle A object map and the vehicle B object map are sufficiently similar. The authenticating the vehicle B includes authenticating in response to verifying that the vehicle A object map and the vehicle B object map are sufficiently similar.

In Example 21, the verifying that the vehicle A object map and the vehicle B object map are sufficiently similar of Example 20 includes rotating and/or translating at least one of the vehicle A object map or the vehicle B object map to accommodate different orientations or locations of the vehicle A and the vehicle B.

In Example 22, the verifying that the vehicle A object map and the vehicle B object map are sufficiently similar as in any of Examples 20-21 includes determining that a number of commonly detected objects in the vehicle A object map and the vehicle B object map is higher than a system trust threshold.

In Example 23, the method as in any of Examples 18-22 further includes: determining a ground velocity of one or more objects near vehicle A based on the vehicle A additional sensor data; determining a ground velocity of one or more objects near vehicle B based on the vehicle B additional sensor data; and verifying that the ground velocity of one or more objects near vehicle a and the ground velocity of one or more objects near vehicle B are sufficiently similar.

Example 24 is computer readable storage media storing instructions that, when executed by one or more processors, cause the one or more processors to implement a method or realize a system or apparatus as in any of Examples 1-23.

Example 25 is a method for authenticating vehicle-to-vehicle communication. The method includes: receiving sensor data from a first vehicle and secondary sensor data from a second vehicle. The method includes extracting, based on the sensor data and the secondary sensor data, an authentication comprising one or more of: a proximity of the second vehicle to the first vehicle or a common object identified by the sensor data and the secondary sensor data. The method includes determining whether the authentication satisfies a trust threshold of the first vehicle.

Example 26 is a method as in Example 25, wherein the authentication comprises an equivalent detected ground speed of a common object identified by the sensor data and the secondary sensor data.

Example 27 is a method as in any of Examples 25-26, wherein: the sensor data comprises an image received from a camera of the first vehicle; the sensor data further comprises ranging data received from one or more of a RADAR sensor, a LIDAR sensor, a SONAR sensor, or an ultrasound sensor of the first vehicle; the secondary sensor data comprises a secondary image received from a camera of the second vehicle; and the secondary sensor data further comprises secondary ranging data received from one or more of a RADAR sensor, a LIDAR sensor, a SONAR sensor, or an ultrasound sensor of the second vehicle.

Example 28 is a method as in any of Examples 25-27, further comprising extracting an authentication point from the camera image, wherein the authentication point comprises one or more of: a distance of the second vehicle relative to the first vehicle; an azimuth angle between the second vehicle and the first vehicle; or a vehicle identification of the second vehicle.

Example 29 is a method as in any of Examples 25-28, further comprising verifying the authentication point based on the ranging data, wherein verifying the authentication point comprises: extracting a ranging authentication point from the ranging data. The ranging authentication point comprises one or more of: the distance of the second vehicle relative to the first vehicle; or the azimuth angle between the second vehicle and the first vehicle. The method further comprises cross-checking the authentication point extracted from the image with a corresponding ranging authentication point; and verifying the authentication point is equal to the corresponding ranging authentication point within an error boundary.

Example 30 is a method as in any of Examples 25-29, further comprising exchanging a heading angle of the first vehicle or the second vehicle to compensate for an angle discrepancy between the sensor data and the secondary sensor data.

Example 31 is a method as in any of Examples 25-30, further comprising: receiving an object map captured by one or more sensors of the first vehicle; receiving a secondary object map captured by one or more sensors of the second vehicle; aligning the secondary object map with the object map to generate an overlaid object map by rotating and/or translating one of the object map or the secondary object map; and determining whether there is one or more object matches between the object map and the secondary object map based on the overlaid object map.

Example 32 is a method as in any of Examples 25-31, further comprising: determining whether the one or more object matches between the object map and the secondary object map satisfies a trust threshold for an application of the first vehicle; authenticating communication between the application of the first vehicle and the second vehicle if the one or more object matches satisfies the trust threshold for the application; and denying communication between the application of the first vehicle and the second vehicle if the one or more object matches does not satisfy the trust threshold for the application.

Example 33 is a method as in any of Examples 25-32, further comprising: determining whether the one or more object matches between the object map and the secondary object map satisfies a global trust threshold for the first vehicle; authenticating communication between the first vehicle and the second vehicle if the one or more object matches satisfies the global trust threshold.

Example 34 is a method as in any of Examples 25-33, wherein determining whether the authentication satisfies the trust threshold of the first vehicle comprises verifying one or more of: an identify of the second vehicle; whether the second vehicle is within a close proximity to the first vehicle; a presence of one or more common objects sensed by the sensor data and the secondary sensor data; or equivalent determined ground speeds for one or more common objects based on the sensor data and the secondary sensor data.

Example 35 is a method as in any of Examples 25-34, further comprising permitting communication between the first vehicle and the second vehicle if the verification meets the trust threshold of the first vehicle.

Example 36 is a system for authenticating vehicle-to-vehicle communication. The system includes: a first vehicle comprising one or more sensors providing sensor data; and a vehicle controller in communication with the one or more sensors and configured to receive secondary sensor data from a second vehicle. The system is such that the vehicle controller comprises non-transitory computer readable storage media storing instructions that, when executed by one or more processors, cause the one or more processors to: receive sensor data from the one or more sensors of the first vehicle; receive secondary sensor data from the second vehicle; extract, based on the sensor data and the secondary sensor data, an authentication comprising one or more of: a proximity of the second vehicle relative to the first vehicle; a common object identified by the sensor data and the secondary sensor data; or an equivalent detected ground speed of a common object identified by the sensor data and the secondary sensor data. The instructions further cause the one or more processors to determine whether the authentication satisfies a trust threshold of the first vehicle.

Example 37 is a system as in Example 36, wherein: the sensor data comprises an image received from a camera of the first vehicle; the sensor data further comprises ranging data received from one or more of a RADAR sensor, a LIDAR sensor, a SONAR sensor, or an ultrasound sensor of the first vehicle; the secondary sensor data comprises a secondary image received from a camera of the second vehicle; and the secondary sensor data further comprises secondary ranging data received from one or more of a RADAR sensor, a LIDAR sensor, a SONAR sensor, or an ultrasound sensor of the second vehicle.

Example 38 is a system as in any of Examples 36-37, wherein the instructions further cause the one or more processors to extract an authentication point from the camera image, wherein the authentication point comprises one or more of: a distance of the second vehicle relative to the first vehicle; an azimuth angle between the second vehicle and the first vehicle; or a vehicle identification of the second vehicle.

Example 39 is a system as in any of Examples 36-38, wherein the instructions further cause the one or more processors to verify the authentication point based on the ranging data, wherein verifying the authentication point comprises: extracting a ranging authentication point from the ranging data, wherein the ranging authentication point comprises one or more of: the distance of the second vehicle relative to the first vehicle; or the azimuth angle between the second vehicle and the first vehicle. The instructions further cause the one or more processors to: cross-check the authentication point extracted from the image with a corresponding ranging authentication point; and verify the authentication point is equal to the corresponding ranging authentication point within an error boundary.

Example 40 is a system as in any of Examples 36-39, wherein the instructions further cause the one or more processors to exchange a heading angle of the first vehicle or the second vehicle to compensate for an angle discrepancy between the sensor data and the secondary sensor data.

Example 41 is non-transitory computer readable storage media storing instructions that, when executed by one or more processors, cause the one or more processors to: receive sensor data from one or more sensors of a first vehicle; receive secondary sensor data from a second vehicle; extract, based on the sensor data and the secondary sensor data, an authentication comprising one or more of: a proximity of the second vehicle relative to the first vehicle; a common object identified by the sensor data and the secondary sensor data; or an equivalent detected ground speed of a common object identified by the sensor data and the secondary sensor data. The instructions further cause the one or more processors to determine whether the authentication satisfies a trust threshold of the first vehicle.

Examples 42 is non-transitory computer readable storage media as in Example 41, wherein: the sensor data comprises an image received from a camera of the first vehicle; the sensor data further comprises ranging data received from one or more of a RADAR sensor, a LIDAR sensor, a SONAR sensor, or an ultrasound sensor of the first vehicle; the secondary sensor data comprises a secondary image received from a camera of the second vehicle; and the secondary sensor data further comprises secondary ranging data received from one or more of a RADAR sensor, a LIDAR sensor, a SONAR sensor, or an ultrasound sensor of the second vehicle.

Example 43 is non-transitory computer readable storage media as in any of Examples 41-42, wherein the instructions further cause the one or more processors to extract an authentication point from the camera image, wherein the authentication point comprises one or more of: a distance of the second vehicle relative to the first vehicle; an azimuth angle between the second vehicle and the first vehicle; or a vehicle identification of the second vehicle.

Example 44 is non-transitory computer readable storage media as in any of Examples 41-43, wherein the instructions further cause the one or more processors to verify the authentication point based on the ranging data, wherein verifying the authentication point comprises: extracting a ranging authentication point from the ranging data, wherein the ranging authentication point comprises one or more of: the distance of the second vehicle relative to the first vehicle; or the azimuth angle between the second vehicle and the first vehicle. The instructions further cause the one or more processors to: cross-check the authentication point extracted from the image with a corresponding ranging authentication point; and verify the authentication point is equal to the corresponding ranging authentication point within an error boundary.

Example 45 is a system or device that includes means for implementing a method or realizing a system or apparatus as in any of Examples 1-44.

The present disclosure may be embodied in other specific forms without departing from its spirit or essential characteristics. The described embodiments are to be considered in all respects only as illustrative, and not restrictive. The scope of the disclosure is, therefore, indicated by the appended claims, rather than by the foregoing description. All changes which come within the meaning and range of equivalency of the claims are to be embraced within their scope.

What is claimed is:

1. A method comprising:
receiving primary sensor data from a first vehicle and secondary sensor data from a second vehicle;
extracting, based on one or more of the primary sensor data or the secondary sensor data, authentication data for use in authenticating vehicle-to-vehicle communications between the first vehicle and the second vehicle, wherein the authentication data comprises:
a primary object map based on the primary sensor data, wherein the primary object map comprises one or more objects surrounding the first vehicle; and
a secondary object map based on the secondary sensor data, wherein the secondary object map comprises one or more objects surrounding the second vehicle;
aligning the primary object map and the secondary object map to generate an overlaid object map; and
determining whether any of the one or more objects surrounding the first vehicle matches any of the one or more objects surrounding the second vehicle based on the overlaid map.

2. The method of claim 1, wherein the authentication data further comprises a proximity value of the second vehicle to the first vehicle.

3. The method of claim 1, wherein:
the primary sensor data comprises a primary image received from a camera of the first vehicle;
the primary sensor data further comprises primary ranging data received from one or more of a RADAR sensor, a LIDAR sensor, a SONAR sensor, or an ultrasound sensor of the first vehicle;
the secondary sensor data comprises a secondary image received from a camera of the second vehicle; and the secondary sensor data further comprises secondary ranging data received from one or more of a RADAR sensor, a LIDAR sensor, a SONAR sensor, or an ultrasound sensor of the second vehicle.

4. The method of claim 3, further comprising extracting an authentication point from the primary image received from the camera of the first vehicle, wherein the authentication point comprises one or more of:
 a distance of the second vehicle relative to the first vehicle;
 an azimuth angle between the second vehicle and the first vehicle; or
 a vehicle identification of the second vehicle.

5. The method of claim 4, further comprising verifying the authentication point based on the ranging data, wherein verifying the authentication point comprises:
 extracting a ranging authentication point from the primary ranging data, wherein the ranging authentication point comprises one or more of:
  the distance of the second vehicle relative to the first vehicle; or
  the azimuth angle between the second vehicle and the first vehicle;
 cross-checking the authentication point extracted from the primary image with a corresponding ranging authentication point; and
 verifying the authentication point is equal to the corresponding ranging authentication point within an error boundary.

6. The method of claim 1, further comprising exchanging a heading angle of the first vehicle or the second vehicle to compensate for an angle discrepancy between the primary sensor data and the secondary sensor data.

7. The method of claim 1, wherein:
 aligning the primary object map and the secondary object map comprises rotating and/or translating one of the primary object map or the secondary object map; and
 determining whether any of the one or more objects surrounding the first vehicle matches any of the one or more objects surrounding the second vehicle comprises determining whether there are one or more common objects identified in the primary object map and the secondary object map based on the overlaid object map.

8. The method of claim 7, further comprising:
 determining whether the one or more common objects satisfies a trust threshold for an application of the first vehicle;
 authenticating communication between the application of the first vehicle and the second vehicle if the one or more common objects satisfies the trust threshold for the application; and
 denying communication between the application of the first vehicle and the second vehicle if the one or more common objects does not satisfy the trust threshold for the application.

9. The method of claim 7, further comprising:
 determining whether the one or more common objects identified in the primary object map and the secondary object map satisfies a global trust threshold for the first vehicle;
 authenticating communication between the first vehicle and the second vehicle if the one or more common objects satisfies the global trust threshold.

10. The method of claim 1, further comprising determining whether the authentication data satisfies a trust threshold of the first vehicle by verifying one or more of:
 an identity of the second vehicle;
 whether the second vehicle is within a close proximity to the first vehicle; or
 a presence of one or more common objects sensed by the primary sensor data and the secondary sensor data.

11. The method of claim 10, further comprising permitting communication between the first vehicle and the second vehicle if the authentication data satisfies the trust threshold of the first vehicle.

12. A system comprising:
 a first vehicle comprising one or more sensors providing primary sensor data; and
 a vehicle controller in communication with the one or more sensors and configured to receive secondary sensor data from a second vehicle;
 wherein the vehicle controller comprises one or more processors configurable to execute instructions stored in non-transitory computer readable storage media, the instructions comprising:
  receiving primary sensor data from the one or more sensors of the first vehicle;
  receiving secondary sensor data from the second vehicle;
  extracting, based on one or more of the primary sensor data or the secondary sensor data, authentication data for use in authenticating vehicle-to-vehicle communications between the first vehicle and the second vehicle, wherein the authentication data comprises:
   a primary object map based on the primary sensor data, wherein the primary object map comprises one or more objects surrounding the first vehicle; and
   a secondary object map based on the secondary sensor data, wherein the secondary object map comprises one or more objects surrounding the second vehicle;
  aligning the primary object map and the secondary object map to generate an overlaid map; and
  determining whether any of the one or more objects surrounding the first vehicle matches any of the one or more objects surrounding the second vehicle based on the overlaid map.

13. The system of claim 12, wherein:
 the primary sensor data comprises a primary image received from a camera of the first vehicle;
 the primary sensor data further comprises primary ranging data received from one or more of a RADAR sensor, a LIDAR sensor, a SONAR sensor, or an ultrasound sensor of the first vehicle;
 the secondary sensor data comprises a secondary image received from a camera of the second vehicle; and
 the secondary sensor data further comprises secondary ranging data received from one or more of a RADAR sensor, a LIDAR sensor, a SONAR sensor, or an ultrasound sensor of the second vehicle.

14. The system of claim 13, wherein the instructions further comprise extracting an authentication point from the primary image received from the camera of the first vehicle, wherein the authentication point comprises one or more of:
 a distance of the second vehicle relative to the first vehicle;
 an azimuth angle between the second vehicle and the first vehicle; or
 a vehicle identification of the second vehicle.

15. The system of claim 14, wherein the instructions further comprise verifying the authentication point based on the primary ranging data, wherein verifying the authentication point comprises:
  extracting a ranging authentication point from the primary ranging data, wherein the ranging authentication point comprises one or more of:
    the distance of the second vehicle relative to the first vehicle; or
    the azimuth angle between the second vehicle and the first vehicle;
  cross-checking the authentication point extracted from the primary image with a corresponding ranging authentication point; and
  verifying the authentication point is equal to the corresponding ranging authentication point within an error boundary.

16. The system of claim 12, wherein the instructions further comprise exchanging a heading angle of the first vehicle or the second vehicle to compensate for an angle discrepancy between the primary sensor data and the secondary sensor data.

17. Non-transitory computer readable storage media storing instructions for execution by one or more processors, the instructions comprising:
  receiving primary sensor data from one or more sensors of a first vehicle;
  receiving secondary sensor data from a second vehicle;
  extracting, based on one or more of the primary sensor data or the secondary sensor data, authentication data for use in authenticating vehicle-to-vehicle communications between the first vehicle and the second vehicle, wherein the authentication data comprises:
    a primary object map based on the primary sensor data, wherein the primary object map comprises one or more objects surrounding the first vehicle; and
    a secondary object map based on the secondary sensor data, wherein the secondary object map comprises one or more objects surrounding the second vehicle;
  aligning the primary object map and the secondary object map to generate an overlaid map; and
  determining whether any of the one or more objects surrounding the first vehicle matches any of the one or more objects surrounding the second vehicle based on the overlaid map.

18. The non-transitory computer readable storage media of claim 17, wherein:
  the primary sensor data comprises a primary image received from a camera of the first vehicle;
  the primary sensor data further comprises primary ranging data received from one or more of a RADAR sensor, a LIDAR sensor, a SONAR sensor, or an ultrasound sensor of the first vehicle;
  the secondary sensor data comprises a secondary image received from a camera of the second vehicle; and
  the secondary sensor data further comprises secondary ranging data received from one or more of a RADAR sensor, a LIDAR sensor, a SONAR sensor, or an ultrasound sensor of the second vehicle.

19. The non-transitory computer readable storage media of claim 18, wherein the instructions further comprise extracting an authentication point from the primary image received from the camera of the first vehicle, wherein the authentication point comprises one or more of:
  a distance of the second vehicle relative to the first vehicle;
  an azimuth angle between the second vehicle and the first vehicle; or
  a vehicle identification of the second vehicle.

20. The non-transitory computer readable storage media of claim 19, wherein the instructions further comprise verifying the authentication point based on the primary ranging data, wherein verifying the authentication point comprises:
  extracting a ranging authentication point from the primary ranging data, wherein the ranging authentication point comprises one or more of:
    the distance of the second vehicle relative to the first vehicle; or
    the azimuth angle between the second vehicle and the first vehicle;
  cross-checking the authentication point extracted from the primary image with a corresponding ranging authentication point; and
  verifying the authentication point is equal to the corresponding ranging authentication point within an error boundary.

* * * * *